United States Patent
Ellis et al.

(10) Patent No.: US 9,244,519 B1
(45) Date of Patent: Jan. 26, 2016

(54) STORAGE SYSTEM WITH DATA TRANSFER RATE ADJUSTMENT FOR POWER THROTTLING

(71) Applicant: SMART Storage Systems, Inc., Chandler, AZ (US)

(72) Inventors: Robert W. Ellis, Phoenix, AZ (US); Kenneth B. DelPapa, Madison, WI (US); Gregg S. Lucas, Tucson, AZ (US)

(73) Assignee: SMART STORAGE SYSTEMS. INC., Milpitas, CA (US)

( * ) Notice: Subject to any disclaimer, the term of this patent is extended or adjusted under 35 U.S.C. 154(b) by 278 days.

(21) Appl. No.: 13/926,900

(22) Filed: Jun. 25, 2013

(51) Int. Cl.
*G06F 1/26* (2006.01)
*G06F 1/32* (2006.01)
*G06F 13/38* (2006.01)

(52) U.S. Cl.
CPC .............. *G06F 1/3268* (2013.01); *G06F 1/26* (2013.01); *G06F 1/3253* (2013.01); *G06F 13/38* (2013.01)

(58) Field of Classification Search
CPC ............................. G06F 1/3253; G06F 1/3268
USPC .................................................. 713/322, 340
See application file for complete search history.

(56) References Cited

U.S. PATENT DOCUMENTS

| | | |
|---|---|---|
| 4,048,481 A | 9/1977 | Bailey, Jr. et al. |
| 4,839,587 A | 6/1989 | Flatley et al. |
| 5,034,744 A | 7/1991 | Obinata |
| 5,210,854 A | 5/1993 | Beaverton et al. |
| 5,311,395 A | 5/1994 | McGaha et al. |
| 5,450,354 A | 9/1995 | Sawada et al. |
| 5,479,638 A | 12/1995 | Assar et al. |
| 5,784,174 A | 7/1998 | Fujino et al. |
| 5,790,828 A | 8/1998 | Jost |
| 5,949,785 A | 9/1999 | Beasley |
| 5,963,893 A | 10/1999 | Halstead, Jr. et al. |
| 5,963,983 A | 10/1999 | Sakakura et al. |
| 6,034,897 A | 3/2000 | Estakhri et al. |
| 6,069,827 A | 5/2000 | Sinclair |
| 6,091,652 A | 7/2000 | Haehn et al. |

(Continued)

FOREIGN PATENT DOCUMENTS

| | | |
|---|---|---|
| EP | 1 956 489 A2 | 8/2008 |
| EP | 1 990 921 A2 | 11/2008 |

(Continued)

OTHER PUBLICATIONS

Ulinktech, "ATA Command Table (in Alphabetic Order)," Feb. 6, 2011, https://web.archive.org/web/20110206060820/http://www.ulinktech.com/downloads/AT, 5 pages.

(Continued)

*Primary Examiner* — Chun Cao
(74) *Attorney, Agent, or Firm* — Morgan, Lewis & Bockius LLP

(57) ABSTRACT

A storage control system, and a method of operation thereof, including: a host interface unit for receiving a host command from a host system; a power measurement hardware, coupled to the host interface unit, for reading a current value of electrical power supplied by the host system in response to the host command; and a power monitor controller, coupled to the power measurement hardware, for adjusting a bus speed for controlling data transfer through a channel shared by a number of non-volatile memory devices, the bus speed is adjusted based on the current value of the electrical power.

19 Claims, 10 Drawing Sheets

(56) References Cited

U.S. PATENT DOCUMENTS

| | | |
|---|---|---|
| 6,275,436 B1 | 8/2001 | Tobita et al. |
| 6,345,367 B1 | 2/2002 | Sinclair |
| 6,356,447 B2 | 3/2002 | Scafidi |
| 6,381,176 B1 | 4/2002 | Kim et al. |
| 6,381,670 B1 | 4/2002 | Lee et al. |
| 6,412,080 B1 | 6/2002 | Fleming et al. |
| 6,529,997 B1 | 3/2003 | Debiez et al. |
| 6,552,581 B1 | 4/2003 | Gabara |
| 6,587,915 B1 | 7/2003 | Kim |
| 6,618,249 B2 | 9/2003 | Fairchild |
| 6,661,503 B1 | 12/2003 | Yamaguchi et al. |
| 6,728,913 B1 | 4/2004 | Parker |
| 6,763,424 B2 | 7/2004 | Conley |
| 6,775,792 B2 | 8/2004 | Ulrich et al. |
| 6,778,387 B2 | 8/2004 | Fairchild |
| 6,850,443 B2 | 2/2005 | Lofgren et al. |
| 6,854,070 B2 | 2/2005 | Johnson et al. |
| 6,871,304 B2 | 3/2005 | Hadjihassan et al. |
| 6,903,972 B2 | 6/2005 | Lasser et al. |
| 6,906,961 B2 | 6/2005 | Eggleston et al. |
| 6,975,028 B1 | 12/2005 | Wayburn et al. |
| 7,082,495 B2 | 7/2006 | DeWhitt et al. |
| 7,107,389 B2 | 9/2006 | Inagaki et al. |
| 7,139,864 B2 | 11/2006 | Bennett et al. |
| 7,233,497 B2 | 6/2007 | Simon et al. |
| 7,243,186 B2 | 7/2007 | Liang et al. |
| 7,298,888 B2 | 11/2007 | Hamar |
| 7,330,927 B1 | 2/2008 | Reeve et al. |
| 7,333,364 B2 | 2/2008 | Yu et al. |
| 7,350,101 B1 | 3/2008 | Nguyen et al. |
| 7,355,896 B2 | 4/2008 | Li et al. |
| 7,434,122 B2 | 10/2008 | Jo |
| 7,441,067 B2 | 10/2008 | Gorobets et al. |
| 7,516,267 B2 | 4/2009 | Coulson et al. |
| 7,613,871 B2 | 11/2009 | Tanaka et al. |
| 7,620,710 B2 | 11/2009 | Kottomtharayil et al. |
| 7,620,769 B2 | 11/2009 | Lee et al. |
| 7,639,532 B2 | 12/2009 | Roohparvar et al. |
| 7,661,054 B2 | 2/2010 | Huffman et al. |
| 7,679,948 B2 | 3/2010 | Park et al. |
| 7,693,422 B2 | 4/2010 | Alicherry et al. |
| 7,738,502 B2 | 6/2010 | Chang et al. |
| 7,743,216 B2 | 6/2010 | Lubbers et al. |
| 7,818,525 B1 | 10/2010 | Frost et al. |
| 7,827,348 B2 | 11/2010 | Lee et al. |
| 7,830,164 B2 | 11/2010 | Earle et al. |
| 7,853,749 B2 | 12/2010 | Kolokowsky |
| 7,979,614 B1 | 7/2011 | Yang |
| 8,000,161 B2 | 8/2011 | Stan et al. |
| 8,001,135 B2 | 8/2011 | Permutter et al. |
| 8,010,738 B1 | 8/2011 | Chilton et al. |
| 8,028,123 B2 | 9/2011 | Kilzer et al. |
| 8,046,645 B2 | 10/2011 | Hsu et al. |
| 8,051,241 B2 | 11/2011 | Feldman et al. |
| 8,072,805 B2 | 12/2011 | Chou et al. |
| 8,095,724 B2 | 1/2012 | Ji et al. |
| 8,095,765 B2 | 1/2012 | Asnaashari et al. |
| 8,117,396 B1 | 2/2012 | Fair et al. |
| 8,127,202 B2 | 2/2012 | Cornwell et al. |
| 8,145,984 B2 | 3/2012 | Sommer et al. |
| 8,154,921 B2 | 4/2012 | Mokhlesi et al. |
| 8,169,825 B1 | 5/2012 | Shalvi et al. |
| 8,205,028 B1 * | 6/2012 | Sakarda ............ 710/307 |
| 8,209,677 B2 | 6/2012 | Shintani et al. |
| 8,219,724 B1 | 7/2012 | Caruso et al. |
| 8,219,776 B2 | 7/2012 | Forhan et al. |
| 8,228,701 B2 | 7/2012 | Sokolov et al. |
| 8,245,101 B2 | 8/2012 | Olbrich et al. |
| 8,250,621 B2 | 8/2012 | Cha |
| 8,254,172 B1 | 8/2012 | Kan |
| 8,259,506 B1 | 9/2012 | Sommer et al. |
| 8,289,801 B2 | 10/2012 | Smith et al. |
| 8,296,534 B1 | 10/2012 | Gupta et al. |
| 8,332,578 B2 | 12/2012 | Frickey, III et al. |
| 8,363,413 B2 | 1/2013 | Paquette et al. |
| 8,369,141 B2 | 2/2013 | Sommer et al. |
| 8,386,700 B2 | 2/2013 | Olbrich et al. |
| 8,386,860 B2 | 2/2013 | Tseng et al. |
| 8,397,101 B2 | 3/2013 | Goss et al. |
| 8,407,409 B2 | 3/2013 | Kawaguchi |
| 8,464,106 B2 | 6/2013 | Filor et al. |
| 8,503,238 B1 | 8/2013 | Wu et al. |
| 8,521,981 B2 | 8/2013 | Strauss et al. |
| 8,560,770 B2 | 10/2013 | Haines et al. |
| 8,601,203 B2 | 12/2013 | Holbrook et al. |
| 8,612,669 B1 | 12/2013 | Syu et al. |
| 8,612,804 B1 | 12/2013 | Kang et al. |
| 8,661,184 B2 | 2/2014 | Wood et al. |
| 8,694,811 B2 * | 4/2014 | Raju et al. ............ 713/320 |
| 8,750,052 B2 | 6/2014 | Aoki et al. |
| 8,793,556 B1 | 7/2014 | Northcott et al. |
| 8,799,747 B2 | 8/2014 | Goss et al. |
| 8,832,506 B2 | 9/2014 | Griffin et al. |
| 8,880,838 B2 | 11/2014 | Kaiser et al. |
| 8,984,216 B2 * | 3/2015 | Fillingim ............ 711/105 |
| 9,043,668 B2 | 5/2015 | Goss et al. |
| 9,069,468 B2 | 6/2015 | Mehra et al. |
| 9,116,401 B2 | 8/2015 | Kim et al. |
| 2002/0056025 A1 | 5/2002 | Qiu et al. |
| 2002/0156891 A1 | 10/2002 | Ulrich et al. |
| 2002/0159285 A1 | 10/2002 | Morley et al. |
| 2003/0033308 A1 | 2/2003 | Patel et al. |
| 2003/0046603 A1 | 3/2003 | Harari et al. |
| 2003/0074592 A1 | 4/2003 | Hasegawa |
| 2003/0163633 A1 | 8/2003 | Aasheim et al. |
| 2004/0080985 A1 | 4/2004 | Chang et al. |
| 2004/0088511 A1 | 5/2004 | Bacon et al. |
| 2004/0252670 A1 | 12/2004 | Rong et al. |
| 2005/0021904 A1 | 1/2005 | Iaculo et al. |
| 2005/0038792 A1 | 2/2005 | Johnson |
| 2005/0073884 A1 | 4/2005 | Gonzalez et al. |
| 2005/0076102 A1 | 4/2005 | Chen et al. |
| 2005/0144516 A1 | 6/2005 | Gonzalez et al. |
| 2006/0015683 A1 | 1/2006 | Ashmore et al. |
| 2006/0020745 A1 | 1/2006 | Conley et al. |
| 2006/0022054 A1 | 2/2006 | Elhamias et al. |
| 2006/0080505 A1 | 4/2006 | Arai et al. |
| 2006/0136682 A1 | 6/2006 | Haridas et al. |
| 2006/0143365 A1 | 6/2006 | Kikuchi |
| 2006/0143475 A1 | 6/2006 | Herbert et al. |
| 2006/0253641 A1 | 11/2006 | Gatzemeier et al. |
| 2006/0256624 A1 | 11/2006 | Eggleston et al. |
| 2006/0282644 A1 | 12/2006 | Wong |
| 2006/0294574 A1 | 12/2006 | Cha |
| 2007/0050536 A1 | 3/2007 | Kolokowsky |
| 2007/0061511 A1 | 3/2007 | Faber |
| 2007/0067598 A1 | 3/2007 | Fujimoto |
| 2007/0079152 A1 | 4/2007 | Winick et al. |
| 2007/0083779 A1 | 4/2007 | Misaka et al. |
| 2007/0226592 A1 | 9/2007 | Radke |
| 2007/0234004 A1 | 10/2007 | Oshima et al. |
| 2007/0260811 A1 | 11/2007 | Merry et al. |
| 2007/0263444 A1 | 11/2007 | Gorobets et al. |
| 2007/0276973 A1 | 11/2007 | Tan et al. |
| 2008/0028246 A1 | 1/2008 | Witham |
| 2008/0046630 A1 | 2/2008 | Lasser |
| 2008/0052446 A1 | 2/2008 | Lasser et al. |
| 2008/0082736 A1 | 4/2008 | Chow et al. |
| 2008/0126720 A1 | 5/2008 | Danilak |
| 2008/0183918 A1 | 7/2008 | Dhokia et al. |
| 2008/0189588 A1 | 8/2008 | Tanaka et al. |
| 2008/0263289 A1 | 10/2008 | Hosoya et al. |
| 2008/0313505 A1 | 12/2008 | Lee et al. |
| 2009/0006900 A1 | 1/2009 | Lastras-Montano et al. |
| 2009/0019321 A1 | 1/2009 | Radke |
| 2009/0070651 A1 | 3/2009 | Diggs et al. |
| 2009/0083587 A1 | 3/2009 | Ng et al. |
| 2009/0089485 A1 | 4/2009 | Yeh |
| 2009/0091990 A1 | 4/2009 | Park et al. |
| 2009/0109786 A1 | 4/2009 | Ye et al. |
| 2009/0125670 A1 | 5/2009 | Keays |
| 2009/0138654 A1 | 5/2009 | Sutardja |
| 2009/0146721 A1 | 6/2009 | Kurooka et al. |
| 2009/0157948 A1 | 6/2009 | Trichina et al. |

(56) References Cited

U.S. PATENT DOCUMENTS

| | | |
|---|---|---|
| 2009/0164702 A1 | 6/2009 | Kern |
| 2009/0164710 A1 | 6/2009 | Choi et al. |
| 2009/0172248 A1 | 7/2009 | You |
| 2009/0172262 A1 | 7/2009 | Olbrich et al. |
| 2009/0179707 A1 | 7/2009 | Higashino |
| 2009/0228634 A1 | 9/2009 | Nakamura et al. |
| 2009/0228761 A1 | 9/2009 | Perlmutter et al. |
| 2009/0259819 A1 | 10/2009 | Chen et al. |
| 2009/0259896 A1 | 10/2009 | Hsu et al. |
| 2009/0271562 A1 | 10/2009 | Sinclair |
| 2009/0287975 A1 | 11/2009 | Kim et al. |
| 2009/0300238 A1 | 12/2009 | Panabaker et al. |
| 2009/0323419 A1 | 12/2009 | Lee et al. |
| 2009/0327581 A1 | 12/2009 | Coulson |
| 2009/0327591 A1 | 12/2009 | Moshayedi |
| 2010/0017650 A1 | 1/2010 | Chin et al. |
| 2010/0023674 A1 | 1/2010 | Aviles |
| 2010/0050053 A1 | 2/2010 | Wilson et al. |
| 2010/0082890 A1 | 4/2010 | Heo et al. |
| 2010/0122019 A1 | 5/2010 | Flynn et al. |
| 2010/0128537 A1 | 5/2010 | Suhail et al. |
| 2010/0138592 A1 | 6/2010 | Cheon |
| 2010/0165689 A1 | 7/2010 | Rotbard et al. |
| 2010/0169541 A1 | 7/2010 | Freikorn |
| 2010/0172179 A1 | 7/2010 | Gorobets et al. |
| 2010/0174845 A1 | 7/2010 | Gorobets et al. |
| 2010/0217898 A1 | 8/2010 | Priborsky et al. |
| 2010/0217915 A1 | 8/2010 | O'Connor et al. |
| 2010/0223531 A1 | 9/2010 | Fukutomi et al. |
| 2010/0228928 A1 | 9/2010 | Asnaashari et al. |
| 2010/0262792 A1 | 10/2010 | Hetzler et al. |
| 2010/0262795 A1 | 10/2010 | Hetzler et al. |
| 2010/0262875 A1 | 10/2010 | Hetzler et al. |
| 2010/0287328 A1 | 11/2010 | Feldman et al. |
| 2010/0293367 A1 | 11/2010 | Berke et al. |
| 2010/0312954 A1 | 12/2010 | Jeon et al. |
| 2010/0318719 A1 | 12/2010 | Keays et al. |
| 2010/0332726 A1 | 12/2010 | Wang |
| 2011/0002224 A1 | 1/2011 | Tamura |
| 2011/0016239 A1 | 1/2011 | Stenfort |
| 2011/0055455 A1 | 3/2011 | Post et al. |
| 2011/0055468 A1 | 3/2011 | Gonzalez et al. |
| 2011/0066788 A1 | 3/2011 | Eleftheriou et al. |
| 2011/0072423 A1 | 3/2011 | Fukata |
| 2011/0078393 A1 | 3/2011 | Lin |
| 2011/0099342 A1 | 4/2011 | Ozdemir |
| 2011/0107144 A1 | 5/2011 | Ohara |
| 2011/0131365 A1 | 6/2011 | Zhang et al. |
| 2011/0131447 A1 | 6/2011 | Prakash et al. |
| 2011/0132000 A1 | 6/2011 | Deane et al. |
| 2011/0138100 A1 | 6/2011 | Sinclair |
| 2011/0145473 A1 | 6/2011 | Maheshwari |
| 2011/0161775 A1 | 6/2011 | Weingarten |
| 2011/0190963 A1 | 8/2011 | Glassl et al. |
| 2011/0191522 A1 | 8/2011 | Condict et al. |
| 2011/0191649 A1 | 8/2011 | Lim et al. |
| 2011/0209032 A1 | 8/2011 | Choi et al. |
| 2011/0238892 A1 | 9/2011 | Tsai et al. |
| 2011/0239088 A1 | 9/2011 | Post |
| 2011/0258496 A1 | 10/2011 | Tseng et al. |
| 2011/0314219 A1 | 12/2011 | Ulrich et al. |
| 2011/0320687 A1 | 12/2011 | Belluomini et al. |
| 2012/0008401 A1 | 1/2012 | Katz et al. |
| 2012/0011393 A1 | 1/2012 | Saika |
| 2012/0047318 A1 | 2/2012 | Yoon et al. |
| 2012/0047320 A1 | 2/2012 | Yoo et al. |
| 2012/0047409 A1 | 2/2012 | Post et al. |
| 2012/0066450 A1 | 3/2012 | Yochai et al. |
| 2012/0079348 A1 | 3/2012 | Naeimi |
| 2012/0079355 A1 | 3/2012 | Patapoutian et al. |
| 2012/0096217 A1 | 4/2012 | Son et al. |
| 2012/0124046 A1 | 5/2012 | Provenzano |
| 2012/0124273 A1 | 5/2012 | Goss et al. |
| 2012/0151260 A1 | 6/2012 | Zimmermann et al. |
| 2012/0170365 A1 | 7/2012 | Kang et al. |
| 2012/0185706 A1 | 7/2012 | Sistla et al. |
| 2012/0213004 A1 | 8/2012 | Yun et al. |
| 2012/0216085 A1 | 8/2012 | Weingarten et al. |
| 2012/0236656 A1 | 9/2012 | Cometti |
| 2012/0239858 A1 | 9/2012 | Melik-Martirosian |
| 2012/0254686 A1 | 10/2012 | Esumi et al. |
| 2012/0266011 A1 | 10/2012 | Storer et al. |
| 2012/0266048 A1 | 10/2012 | Chung et al. |
| 2012/0278530 A1 | 11/2012 | Ebsen |
| 2012/0278531 A1 | 11/2012 | Horn |
| 2012/0284587 A1 | 11/2012 | Yu et al. |
| 2012/0297113 A1 | 11/2012 | Belluomini et al. |
| 2012/0311402 A1 | 12/2012 | Tseng et al. |
| 2012/0317334 A1 | 12/2012 | Suzuki et al. |
| 2012/0324191 A1 | 12/2012 | Strange et al. |
| 2012/0331207 A1 | 12/2012 | Lassa et al. |
| 2013/0007380 A1 | 1/2013 | Seekins et al. |
| 2013/0007543 A1 | 1/2013 | Goss et al. |
| 2013/0054881 A1 | 2/2013 | Ellis et al. |
| 2013/0060994 A1 | 3/2013 | Higgins et al. |
| 2013/0061019 A1 | 3/2013 | Fitzpatrick et al. |
| 2013/0073788 A1 | 3/2013 | Post et al. |
| 2013/0080691 A1 | 3/2013 | Weingarten et al. |
| 2013/0094289 A1 | 4/2013 | Sridharan et al. |
| 2013/0100600 A1 | 4/2013 | Yin et al. |
| 2013/0104005 A1 | 4/2013 | Weingarten et al. |
| 2013/0124792 A1 | 5/2013 | Melik-Martirosian et al. |
| 2013/0151753 A1 | 6/2013 | Jeon et al. |
| 2013/0198436 A1 | 8/2013 | Bandic et al. |
| 2013/0205102 A1 | 8/2013 | Jones et al. |
| 2013/0232290 A1 | 9/2013 | Ish et al. |
| 2013/0238833 A1 | 9/2013 | Vogan et al. |
| 2013/0265825 A1 | 10/2013 | Lassa |
| 2013/0332791 A1 | 12/2013 | Chu |
| 2014/0036589 A1 | 2/2014 | Parthasarathy et al. |
| 2014/0059359 A1* | 2/2014 | Bahirat ............... 713/300 |
| 2014/0108891 A1 | 4/2014 | Strasser et al. |
| 2014/0129874 A1 | 5/2014 | Zaltsman et al. |
| 2014/0158525 A1 | 6/2014 | Greene |
| 2014/0181370 A1 | 6/2014 | Cohen et al. |
| 2014/0208174 A1 | 7/2014 | Ellis et al. |
| 2014/0372777 A1* | 12/2014 | Reller et al. ............... 713/320 |

FOREIGN PATENT DOCUMENTS

| | | |
|---|---|---|
| EP | 2 498 259 A2 | 9/2012 |
| JP | 2012129859 A | 7/2012 |
| WO | WO 2009/042298 | 4/2009 |
| WO | WO 2011/156466 | 12/2011 |

OTHER PUBLICATIONS

International Search Report dated Mar. 25, 2014, received in International Patent Application No. PCT/US2013/072400, which corresponds to U.S. Appl. No. 13/690,337, 3 pages (Ellis).

Invitation to Pay Additional Fees dated Jul. 25, 2014, received in International Patent Application No. PCT/US2014/021290, which corresponds to U.S. Appl. No. 13/791,797, 8 pages (Dean).

International Search Report dated Jul. 31, 2014, received in International Patent Application No. PCT/US2014/031465, which corresponds to U.S. Appl. No. 13/851,928, 13 pages (Ellis).

International Search Report and Written Opinion dated Jul. 31, 2014, recieved in International Patent Application No. PCT/US2014/033576, which corresponds to U.S. Appl. No. 13/861,326, 9 pages (Fitzpatrick).

Narayanan et al., "Migrating Server Storage to SSD's: Analysis of Tradeoffs," Computer Systems, Apr. 2009, 12 pages.

Shiraz et al., "Block Aging Prevention Technique (BAP) for Flash Based Solid State Disks,"7th International Conference on Emerging Technologies (ICET), Sep. 5, 2011, 6 pages.

Tai et al, "Prolongation of Lifetime and the Evaluation Method of Dependable SSD," 25 International Symposium on Defect and Fault Tolerance in VLSI Systems, 2010, NJ, USA, 8 pages.

Yimo et al., "WeLe-RAID. A SSD-Based RAID for System Endurance and Performance," Jan. 2011. Network and Parallel Computing, Springer, 14 pages.

(56) References Cited

OTHER PUBLICATIONS

International Search Report and Written Opinion dated Jan. 9, 2016, received in International Patent Application No. PCT/US2014/049731, which corresponds to U.S. Appl. No. 14/334,324, 9 pages (Fitzpatrick).
International Search Report and Written Opinion dated Feb. 18, 2015, received in International Patent Application No. PCT/US2014/055401, which corresponds to U.S. Appl. No. 14/082,031, 9 pages (Higgins).
International Search Report dated Apr. 15, 2014, received in International Patent Application No. PCT/US2013/078340, which corresponds to U.S. Appl. No. 13/746,542, 11 pages (Ellis).
International Search Report and Written Opinion dated Nov. 7, 2014, received in International Patent Application No. PCT/US2014/049732, which corresponds to U.S. Appl. No. 14/334,350, 13 pages (Fitzpatrick).
International Search Report and Written Opinion dated Oct. 17, 2014, recieved in International Patent Application No. PCT/US2014/049734, which corresponds to U.S. Appl. No. 14/332,259, 8 pages (Higgins).
International Search Report and Written Opinion dated Oct. 23, 2014, recieved in International Patent Application No. PCT/US2014/049736, which corresponds to U.S. Appl. No. 14/446,249, 8 pages (Fitzpatrick).
International Search Report and Written Opinion dated Nov. 5, 2014, recieved in International Patent Application No. PCT/US2014/049282, which corresponds to U.S. Appl. No. 13/957,407, 12 pages (Fitzpatrick).
Cooke, "Introduction to Flash Memory (T1A)," Flash Memory Summit, Aug. 22, 2008, Micron Technology, Inc. 102 pages.
Gal at al., "Algorithms and Data Structures for Flash Memories," ACM Computing Surveys, Jun. 2005, vol. 37, No. 2, 30 pages.
IBM Corporation, "Systems Management, Work Management," Version 5, Release 4, 9th Edition, Feb. 2006, pp. 1-21.
O'Brien, "SMART Storage Systems Optlmus SAS Enterprise SSD Review," SMART Storage Systems, Oct. 9, 2012, 44 pages.
Spanjer, "Flash Management—Why and How?" Smart Modular Technologies; Nov. 2009, http://www.scantec.de/fileadmin/pdf/Smart_Modular/Flash-Management.pdf, 14 pages.
Texas instruments, "Power Management IC for Digital Set Top Boxes," SLVSA10A, Sep. 2009, pp. 1-22.
International Search Report and Written Opinion dated Dec. 20, 2013, received in PCT/US2013/045282, which corresponds to U.S. Appl. No. 13/493,949, 7 pages (Ellis).
International Search Report and Written Opinion dated Jun. 12, 2014, received in PCT/US2014/018972, which corresponds to U.S. Appl. No. 13/779,352, 12 pages (Schmier).
Internatonal Search Report and Written Opinion dated May 14, 2014, received in International Patent Application No. PCT/US2014/017168, which corresponds to US. Appl. No. 14/076,115, 6 pages (Fitzpatrick).
International Search Report and Written Opinion dated May 14, 2014, received in International Patent Application No. PCT/US2014/017169, which corresponds to U.S. Appl. No. 14/076,148, 6 pages (Fitzpatrick).
Tseng ct al, "Understanding the Impact of Power Loss on Flash Memory," DAC'11, Jun. 5-10, 2011, San Diego, California, 6 pages.
International Search Report and Written Opinion dated Aug. 22, 2014, received in International Patent Application No. PCT/US2014/032978, which corresponds to U.S. Appl. No. 14/081,992, 10 pages (Ellis).
Online Merriam Webster Dictionary, definition of "Distinct" from Jun. 12, 2011, https://web.archive.org/web/20110612181129/http://www2.merriam-webster.com/cgi-bin/mwdictadu?book=Dictionary&va=distinct.

\* cited by examiner

STORAGE SYSTEM WITH DATA TRANSFER RATE ADJUSTMENT FOR POWER THROTTLING

CROSS-REFERENCE TO RELATED APPLICATION(S)

The present application contains subject matter related to U.S. patent application Ser. No. 13/926,824, filed Jun. 25, 2013, entitled "STORAGE CONTROL SYSTEM WITH POWER THROTTLING MECHANISM AND METHOD OF OPERATION THEREOF". The subject matter thereof is incorporated herein by reference thereto.

TECHNICAL FIELD

The present invention relates generally to a storage control system and more particularly to a system for power throttling.

BACKGROUND ART

Data storage, often called storage or memory, refers to computer components and recording media that retain digital data. Data storage is a core function and fundamental component of consumer and industrial electronics, especially devices such as computers, televisions, cellular phones, mobile devices, and digital video cameras.

Recently, forms of long-term storage other than electromechanical hard disks have become feasible for use in computers. NOT-AND (NAND) flash is one form of non-volatile memory used in solid-state storage devices. The memory cells are arranged in typical row and column fashion with circuitry for accessing individual cells. The memory transistors of those cells are placed to store an analog value that can be interpreted to hold two logical states in the case of Single Level Cell (SLC) or more than two logical states in the case of Multi Level Cell (MLC).

A flash memory cell is light in weight, occupies very little space, and consumes less power than electromechanical disk drives. Construction of a storage system with this type of memory allows for much higher bandwidths and input/output operations per second (IOPS) than typical electromechanical disk drives. More importantly, it is especially rugged and can operate at a much high temperature range. It will withstand without adverse effects repeated drops, each of which would destroy a typical electromechanical hard disk drive. A problem exhibited by flash memory is that it tends to have a limited life in use.

Thus, a need still remains for better data management devices. In view of the increasing demand for data management devices, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a storage control system, including: receiving a host command from a host system; reading a current value of electrical power supplied by the host system in response to the host command; and adjusting a bus speed for controlling data transfer through a channel shared by a number of non-volatile memory devices, the bus speed is adjusted based on the current value of the electrical power.

The present invention provides a storage control system, including: a host interface unit for receiving a host command from a host system; a power measurement hardware, coupled to the host interface unit, for reading a current value of electrical power supplied by the host system in response to the host command; and a power monitor controller, coupled to the power measurement hardware, for adjusting a bus speed for controlling data transfer through a channel shared by a number of non-volatile memory devices, the bus speed is adjusted based on the current value of the electrical power.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
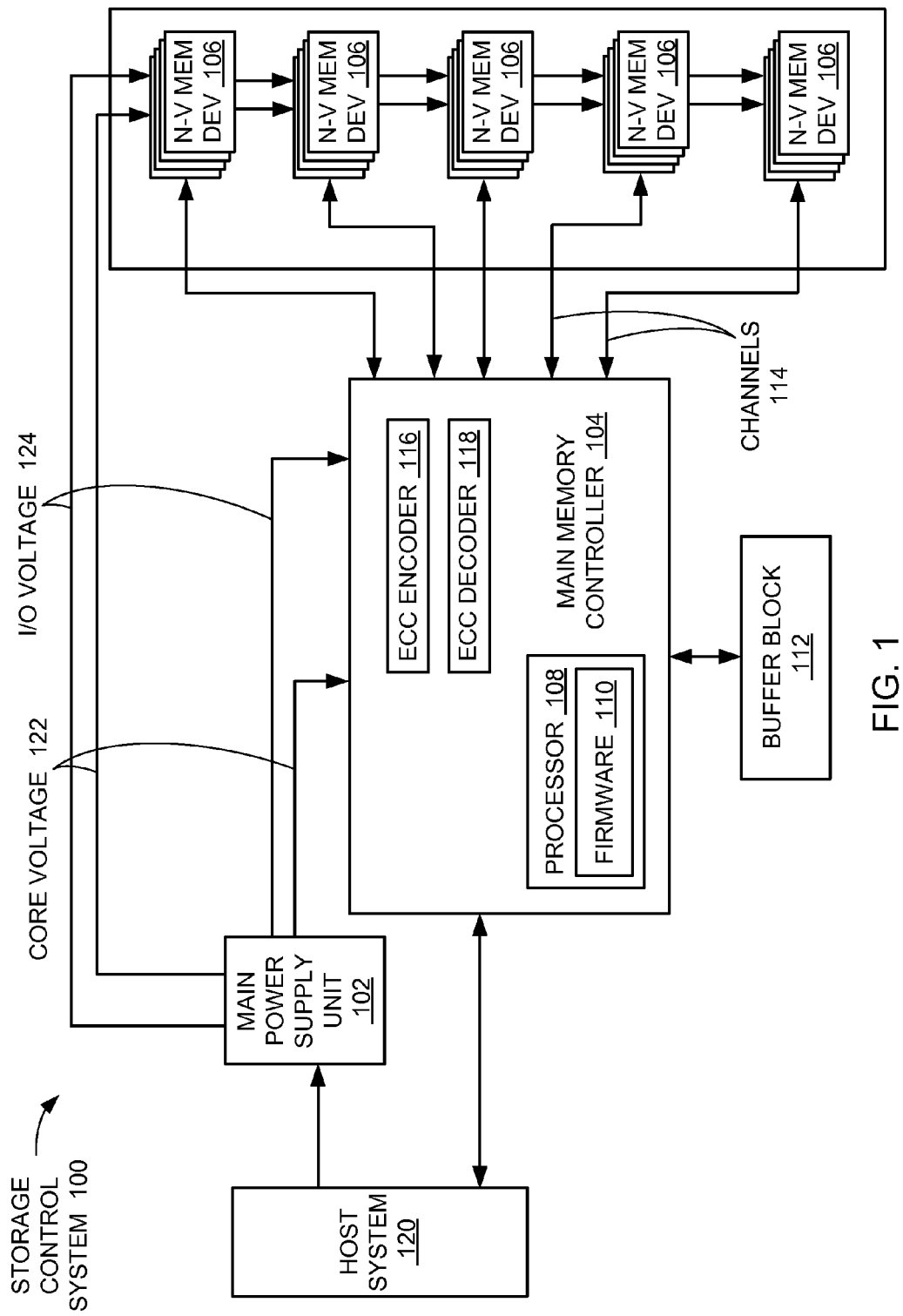
FIG. 1 is a storage control system with power throttling mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a microelectromechanical system (MEMS), passive devices, environmental sensors including temperature sensors, or a combination thereof.

The term "erase block" referred to herein is defined as a group of pages, which is the smallest number of pages that are erased at one time. The term "page" referred to herein is defined as a memory component within an erase block that is programmed as an individual unit. The page is a smallest group of data bytes that are read from or written to in an erase block.

The term "error correction code" (ECC) referred to herein is defined as parity data generated over a set of data grouped into a code word. The term "code word" referred to herein is defined as a group of data bytes covered by a single of multiple ECC parity words.

The term "solid state disk drive" (SSD) referred to herein is defined as a type of devices that use non-volatile memories. For example, a drive or an SSD is a type of devices that use a non-volatile memory including NAND flash as a storage medium.

The term "point of load" (POL) referred to herein is defined as a regulator, which creates a load's needed voltage located physically near the load, as opposed to a single, larger regulator that supplies power to all subsystems or loads.

The term "real time measurements" referred to herein is defined as a process for data collected from hardware, software, or a combination thereof. The real time measurements represent current states of operation and characteristics of a drive.

The term "open loop" referred to herein is defined as run time adjustments made based on pre-formed tables and operation counts, without monitoring hardware current or power. The term "closed loop" referred to herein is defined as run time adjustments made by monitoring operations dynamically as a drive runs. The term "ADC" referred to herein is defined as an analog to digital converter.

The term "poll" referred to herein is defined as a sampling method used in software to monitor a status of an event. The term "bus speed" referred to herein is defined as a data rate on a data bus during a data transfer phase of operation. For example, the bus speed can be a data rate on a NAND flash bus.

Currently, power throttling is performed in a very static way. A typical drive is run and the power is measure for a given performance and workload. From a static power measurement, firmware levels are set to limit a number of outstanding operations that can be executed at a given time. This method does not take into account differences in powers consumed between different drives, an amount of time a flash takes to execute a given operation (which changes over the life of a drive), or controller limitations or execution of commands.

In general, predetermined limits are set at design time for firmware to schedule a given number of operations. The current method runs into real difficulties when recycling, wear leveling, general housekeeping, or other functions run in the background change the load on the NAND. The current method also does not take into account the effects of temperature or NAND age when setting these fixed throttling limits.

More dramatically than hard disk drives, an amount of power that an SSD consumes varies with an amount of host (and internal) activity. This power difference in many cases exceeds two times an idle current for the drive. Additionally, the power usage can be very abrupt and cause power spikes that can create supply voltage transients that can overwhelm a host environment or otherwise exceed the regulation capability of the host power system and take other subsystems offline.

Referring now to FIG. 1, therein is shown a storage control system 100 with power throttling mechanism in an embodiment of the present invention. FIG. 1 depicts a system level block diagram of the storage control system 100. This figure can represent a hardware architecture of an SSD. The storage control system 100 can include bus power throttling of SSD.

The storage control system 100 includes drive level components. The drive level components includes a section for a main power supply unit 102 for providing power supplies to a main memory controller 104 and non-volatile memory devices 106. The main memory controller 104 including a NAND controller includes a processor 108, device controllers (not shown), and memory controllers (not shown). The processor 108 including a central processing unit (CPU) is used to execute a firmware 110.

The device controllers interface with and control the non-volatile memory devices 106 including NAND flash. Although the embodiments described herein refer to using NAND for the non-volatile memory devices 106, it is understood that the embodiments are not limited to using NAND as a memory storage device, which can be monitored and controlled by the main memory controller 104. For example, the non-volatile memory devices 106 include but are not limited to Magnetoresistive random-access memory (MRAM), Ferroelectric RAM (FRAM), and phase-change memory (PCM).

The memory controllers control and interface with a buffer block 112, which is a memory device. For example, in some cases, the buffer block 112 is an external block of memory for tabling and storing data or an array of NAND memory devices. Also for example, the buffer block 112 includes memory and data buffers. Further, for example, the buffer block 112 can include dynamic random access memory (DRAM) or any other volatile memories.

The storage control system 100 includes a number of busses or channels 114 with each of the channels 114 having a number of the non-volatile memory devices 106 including NAND flash devices behind it. There are a number of ways of distributing the data across the channels 114. For example, the data can be distributed using a simple redundant array of independent disks (RAID) 0 stripe. For example, FIG. 1 shows five of the channels 114, although it is understood that there can be any number of the channels 114.

The main memory controller 104 includes an ECC encoder 116 and an ECC decoder 118. The ECC encoder 116 generates ECC parity data for a set of data grouped into a code word to be stored in the non-volatile memory devices 106. The ECC decoder 118 receives and checks ECC parity data for data from the non-volatile memory devices 106. The main memory controller 104 interfaces with a host system 120.

In this configuration, there is no power feedback from any of the components. The main power supply unit 102 is a self-contained unit that generates and provides power for all of the components of the drive based on or sourced by a main host power input from the host system 120. The main power supply unit 102 provides a core voltage 122 and an input/output voltage 124 to the main memory controller 104 and the non-volatile memory devices 106.

For illustration purposes, only the powers from the main power supply unit 102 are shown, although it is understood that there can be other power signals in the storage control system 100. For example, the storage control system 100 can include power feedback signals from any of the components and most importantly a bank of the non-volatile memory devices 106 including NAND memory devices.

Figure 2:
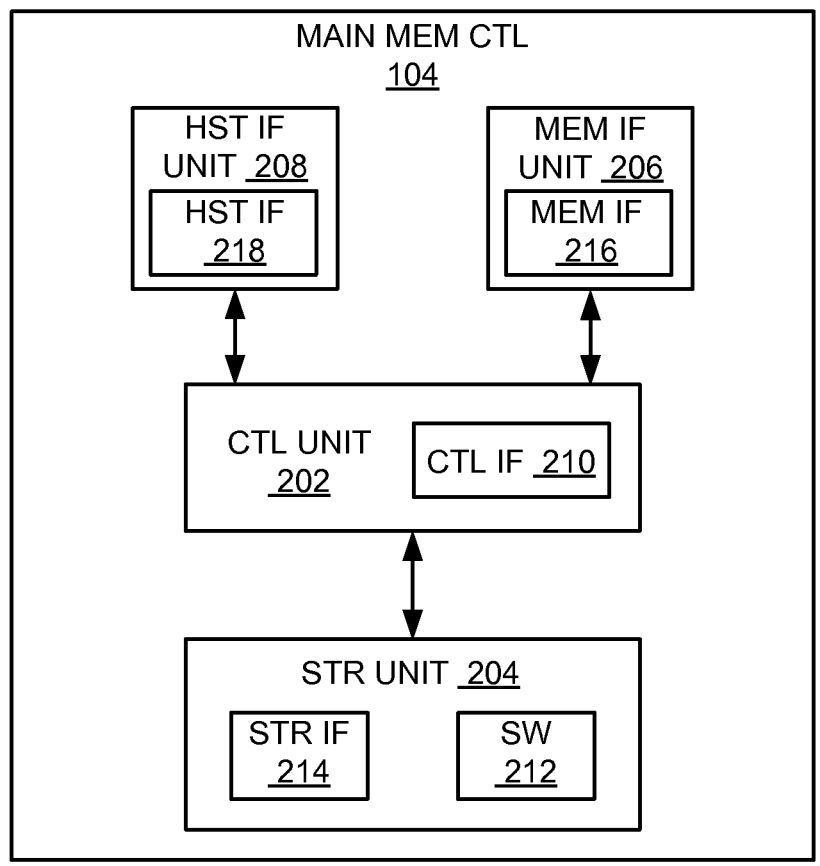
FIG. 2 is an exemplary hardware block diagram of the main memory controller.

Referring now to FIG. 2, therein is shown an exemplary hardware block diagram of the main memory controller 104. The main memory controller 104 can include a control unit 202, a storage unit 204, a memory interface unit 206, and a host interface unit 208. The control unit 202 can include a control interface 210. The control unit 202 can execute a software 212 stored in the storage unit 204 to provide the intelligence of the main memory controller 104.

The control unit 202 can be implemented in a number of different manners. For example, the control unit 202 can be a processor, an embedded processor, a microprocessor, a hardware control logic, a hardware finite state machine (FSM), a digital signal processor (DSP), or a combination thereof.

The control interface 210 can be used for communication between the control unit 202 and other functional units in the main memory controller 104. The control interface 210 can also be used for communication that is external to the main memory controller 104.

The control interface 210 can receive information from the other functional units or from external sources, or can transmit information to the other functional units or to external destinations. The external sources and the external destinations refer to sources and destinations external to the main memory controller 104.

The control interface 210 can be implemented in different ways and can include different implementations depending on which functional units or external units are being interfaced with the control interface 210. For example, the control interface 210 can be implemented with a dedicated hardware including an application-specific integrated circuit (ASIC), a configurable hardware including a field-programmable gate array (FPGA), a discrete electronic hardware, or a combination thereof.

The storage unit 204 can include both hardware and the software 212. For example, the software 212 can include control firmware. The storage unit 204 can include a volatile memory, a nonvolatile memory, an internal memory, an external memory, or a combination thereof. For example, the storage unit 204 can be a nonvolatile storage such as non-volatile random access memory (NVRAM), Flash memory, disk storage, or a volatile storage such as static random access memory (SRAM).

The storage unit 204 can include a storage interface 214. The storage interface 214 can also be used for communication that is external to the main memory controller 104. The storage interface 214 can receive information from the other functional units or from external sources, or can transmit information to the other functional units or to external destinations. The external sources and the external destinations refer to sources and destinations external to the main memory controller 104.

The storage interface 214 can include different implementations depending on which functional units or external units are being interfaced with the storage unit 204. The storage interface 214 can be implemented with technologies and techniques similar to the implementation of the control interface 210.

The memory interface unit 206 can enable external communication to and from the main memory controller 104. For example, the memory interface unit 206 can permit the main memory controller 104 to communicate with the non-volatile memory devices 106 of FIG. 1.

The memory interface unit 206 can include a memory interface 216. The memory interface 216 can be used for communication between the memory interface unit 206 and other functional units in the main memory controller 104. The memory interface 216 can receive information from the other functional units or can transmit information to the other functional units.

The memory interface 216 can include different implementations depending on which functional units are being interfaced with the memory interface unit 206. The memory interface 216 can be implemented with technologies and techniques similar to the implementation of the control interface 210.

The host interface unit 208 allows the host system 120 of FIG. 1 to interface and interact with the main memory controller 104. The host interface unit 208 can include a host interface 218 to provide communication mechanism between the host interface unit 208 and the host system 120.

The control unit 202 can operate the host interface unit 208 to send control or status information generated by the main memory controller 104 to the host system 120. The control unit 202 can also execute the software 212 for the other functions of the main memory controller 104. The control unit 202 can further execute the software 212 for interaction with the non-volatile memory devices 106 via the memory interface unit 206.

The functional units in the main memory controller 104 can work individually and independently of the other functional units. For illustrative purposes, the main memory controller 104 is described by operation of the main memory controller 104 with the host system 120 and the non-volatile memory devices 106. It is understood that the main memory controller 104, the host system 120, and the non-volatile memory devices 106 can operate any of the modules and functions of the main memory controller 104.

Figure 3:
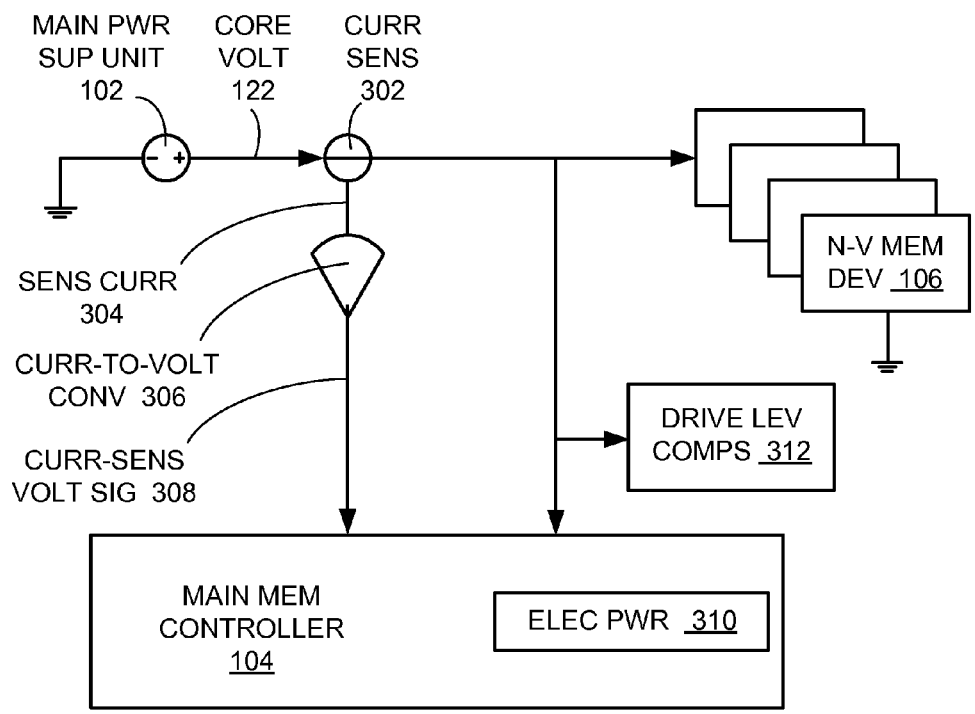
FIG. 3 is a first exemplary block diagram of power measurement for the power throttling mechanism.

Referring now to FIG. 3, therein is shown a first exemplary block diagram of power measurement for the power throttling mechanism. FIG. 3 depicts a high-level block diagram or a top system level architecture of an SSD with a dynamic power control mechanism for the main memory controller 104. The diagram in FIG. 3 shows a high-level block diagram of an SSD with a process that reports a total drive power used in the SSD to the main memory controller 104.

As an SSD goes through different phases of operations including recycling, wear leveling, spare pool and over provisioning resource management, and differing host workloads, the drive can require or utilize differing amounts of power. Most host systems restrict an amount of current, including average and peak currents, which a drive is allowed to use.

Some systems today employ a very static method for power level control by limiting a number of parallel or concurrent operations to fixed values. The embodiments described herein take power control to the next level by having hardware, the firmware 110 of FIG. 1 (or the software 212 of FIG. 2), or a combination thereof to adjust operations of the drive based on "real time measurements".

The embodiments described herein outline additions and modifications to controller architectures to allow the drive to dynamically adjust its internal operations to limit or throttle average and instantaneous power draws. FIG. 3 is a high-level block diagram that demonstrates power measurement performed at a system level. As will be described later, FIGS. 4-7 show monitoring power usage of the non-volatile memory devices 106. Any combination of architectures shown by FIGS. 3-7 provides a power smart Solid State Drive (SSD).

There are two methods described herein to construct the dynamic power control mechanism or dynamic current/power throttling for the main memory controller 104. A first method is to employ a set of external circuitry that is added to the main memory controller 104 that allows the firmware 110 to make run-time decisions on the current/power throttling, as shown in FIG. 3. A second method of the current/power throttling allows the main memory controller 104 to resolve more power levels but also requires more input/output (I/O) pins, as subsequently shown in FIGS. 4-7.

FIG. 3 depicts the core voltage 122 supplied by the main power supply unit 102. The core voltage 122 provides power to the non-volatile memory devices 106 and the main memory controller 104. For example, the core voltage 122 can be a NAND core voltage supply or a direct current (DC) power supply.

The storage control system 100 of FIG. 1 includes a current sensor 302, which is a device that detects an electrical current in a wire. The current sensor 302 generates a sensed current 304, which is a signal proportional to an electrical current provided by a power supply. The sensed current 304 can be an analog current signal. The sensed current 304 can then be utilized by a current-to-voltage converter 306. For example, the current-to-voltage converter 306 can be a trans-impedance amplifier.

The current-to-voltage converter 306 generates a current-sense voltage signal 308 and sends it to the main memory controller 104. An increase of the current-sense voltage signal 308 indicates an increase of electrical power 310 of the storage control system 100. The electrical power 310 represents a total power drawn or consumed by the non-volatile memory devices 106, the main memory controller 104, and other drive level components 312 of the storage control system 100.

The electrical power 310 indicates power consumed by the drive level components through different phases of operations in the drive. The main memory controller 104 monitors the current-sense voltage signal 308 for the power throttling mechanism associated with the run time with the power measurement to control and/or limit a run time power or the electrical power 310.

The current sensor 302 also provides the core voltage 122 to the non-volatile memory devices 106, the main memory controller 104, and any of the drive level components 312. The core voltage 122 can be an analog voltage that is linearly proportional to the electrical current provided by the main power supply unit 102. The core voltage 122 can be a system-level supply or a power supply input to the main memory controller 104 and a number of the non-volatile memory devices 106 including a NAND media array.

It has been discovered that monitoring the current-sense voltage signal 308 based on the sensed current 304 to determine the electrical power 310 provides improved reliability because the monitoring allows a media controller to dynamically adjust the run time power usage of a solid state storage device. As a result, power spikes that create supply voltage transients are eliminated thereby improving the reliability.

Figure 4:
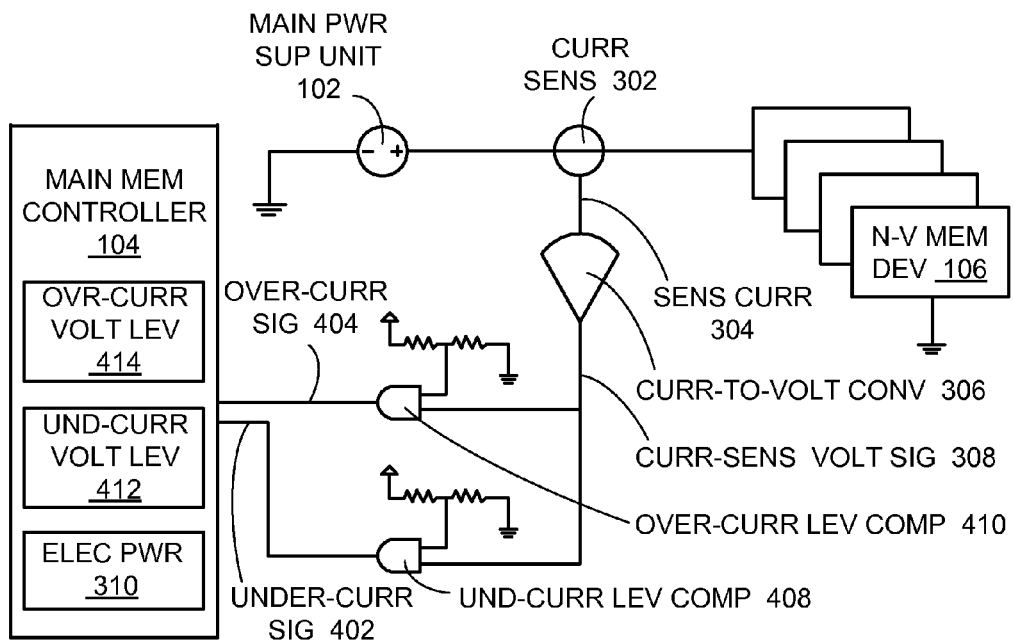
FIG. 4 is a second exemplary block diagram of power measurement for the power throttling mechanism.

Referring now to FIG. 4, therein is shown a second exemplary block diagram of power measurement for the power throttling mechanism. FIG. 4 depicts a two-level power sensor implementation for firmware controlled power throttling.

FIG. 4 depicts a two-bit reporting implementation for the electrical power 310. For example, the electrical power 310 can fall into three categories including under, over, or between predetermined reference voltage levels.

Two inputs, an under-current signal 402 and an over-current signal 404, shown in FIG. 4 can be polled by the software 212 or used to drive interrupt processes in the software 212 to make changes to a runtime process to throttle performance. These input signals are not used to change the operations associated with the non-volatile memory devices 106 but instead are used to control bus transfer speeds of the non-volatile memory devices 106.

The two inputs can be sent to the main memory controller 104 for the power throttling mechanism associated with the run time with the power measurement to control and/or limit a run time power or the electrical power 310. The under-current signal 402 and the over-current signal 404 indicate when the current-sense voltage signal 308 from the current-to-voltage converter 306 are below and above, respectively, predetermined reference voltage levels. The under-current signal 402 and the over-current signal 404 are external to the main memory controller 104.

The storage control system 100 of FIG. 1 includes an under-current level comparator 408 and an over-current level comparator 410, which are devices that compare the current-sense voltage signal 308 from the current-to-voltage converter 306 to the voltage thresholds. The comparison is performed to determine whether the sensed current 304 from the current sensor 302 is below or above the predetermined reference voltage levels.

The under-current level comparator 408 and the over-current level comparator 410 compare the current-sense voltage signal 308 to an under-current voltage level 412 and an over-current voltage level 414 to generate the under-current signal 402 and the over-current signal 404, respectively. The under-current signal 402 and the over-current signal 404 are asserted to an active state when the current-sense voltage signal 308 is below and above the under-current voltage level 412 and the over-current voltage level 414, respectively.

The under-current voltage level 412 and the over-current voltage level 414 are the predetermined reference voltage levels. For example, each of the under-current voltage level 412 and the over-current voltage level 414 can be implemented with a voltage divider using a pair of resistors connected together in series, where one end of one of the resistors is connected to power and one end of another of the resistors is connected to ground.

The current sensor 302 also provides the core voltage 122 to the non-volatile memory devices 106. The core voltage 122 is supplied by the main power supply unit 102.

It has been discovered that comparing the current-sense voltage signal 308 to the under-current voltage level 412 of FIG. 4 and the over-current voltage level 414 to determine the electrical power 310 provides improved reliability because the comparing allows an instantaneous electrical current (power) measurement as a means to control future electrical current usage. As a result, power spikes that overwhelm a host environment are eliminated.

Figure 5:
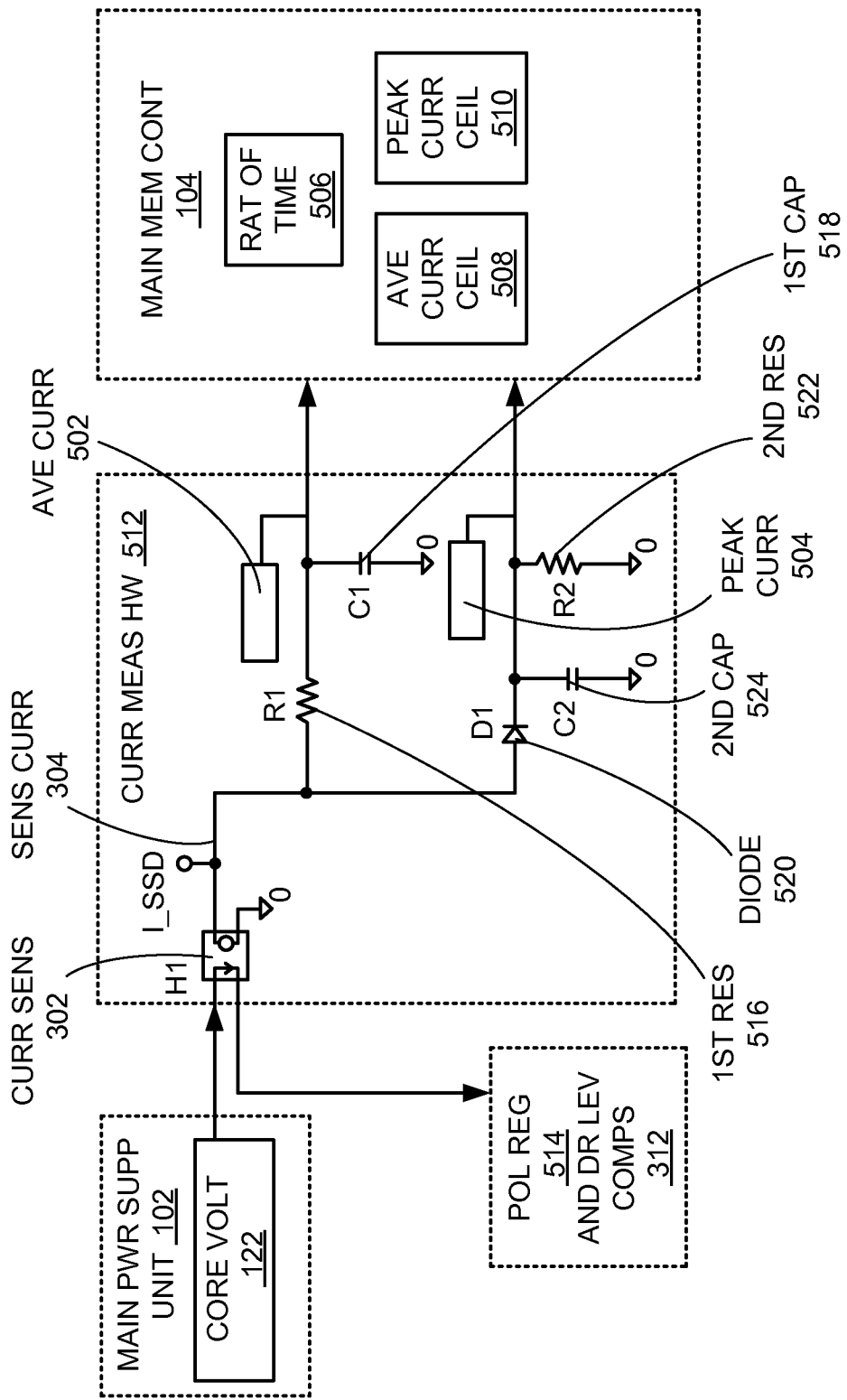
FIG. 5 is a third exemplary block diagram of power measurement for the power throttling mechanism.

Referring now to FIG. 5, therein is shown a third exemplary block diagram of power measurement for the power throttling mechanism. FIG. 5 depicts a detailed exemplary block diagram of an electrical current monitoring hardware.

The firmware and the hardware in the main memory controller 104 are implemented to affect input/output (I/O) scheduling of the non-volatile memory devices 106 of FIG. 1 to regulate an average current 502 (Iavg), a peak current 504 (Ipeak), or a combination thereof. The hardware or the software (or the firmware 110 of FIG. 1) can compare the average current 502 and the peak current 504 to configurable thresholds for the power throttling mechanism associated with the run time with the power measurement to control and/or limit a run time power or the electrical power 310.

When the average current 502 and the peak current 504 exceed the configurable thresholds, a clipping event occurs. The clipping event refers to a method by which parallel I/O operations are reduced or limited to a configurable maximum value. The hardware or the software calculates a ratio of time 506 when the clipping event occurs. For example, the ratio of time 506 can be calculated to be any value including 95% of the time or just 1% of the time.

Based on the ratio of time 506, the hardware or the software scales back or reduces a number of the parallel I/O operations to control or reduce the average current 502. Based on the ratio of time 506, the hardware or the software scales back or reduces the number of the parallel I/O operations and increases time between launching the parallel I/O operations to the non-volatile memory devices 106 to scale back or reduce the peak current 504.

Throttling of the parallel I/O operations is engaged quickly (or fast attack) and removed slowly (or slow decay). The goal is to be able to have a mode page parameter tweakable or configurable by a user. The mode page parameter includes an average current ceiling 508 and a peak current ceiling 510, which are the configurable thresholds of the average current 502 and the peak current 504, respectively.

When the average current 502 and the peak current 504 exceed the average current ceiling 508 and the peak current ceiling 510, respectively, the number of the parallel I/O operations, the time between launching the parallel I/O operations, or a combination thereof can be controlled. As a result, the average current 502 and the peak current 504 are scaled back to be below the average current ceiling 508 and the peak current ceiling 510, respectively.

FIG. 5 depicts a host system power supply or the main power supply unit 102 providing a host voltage or the core voltage 122 to a current measurement hardware 512. The current measurement hardware 512 includes the current sensor 302, denoted as H1, for generating the sensed current 304. The sensed current 304 indicates a current consumed by the SSD, denoted as I_SSD. The core voltage 122 is also provided to point-of-load regulators 514 and the drive level components 312 including the non-volatile memory devices 106, the main memory controller 104, and other power consumer components.

The average current 502 can be determined by implementing a series resistor-capacitor circuit using a first resistor 516 and a first capacitor 518 connected together in series. The first resistor 516 and the first capacitor 518 are denoted as R1 and C1, respectively. The sensed current 304 flows through one end of the first resistor 516 and one end of the first capacitor 518 is connected to ground. The average current 502 is at a node where the first resistor 516 and the first capacitor 518 are connected.

The peak current 504 can be determined by implementing an envelope detector or an amplitude demodulator/detector circuit. The envelope detector can be implemented with a diode 520 connected to a parallel resistor-capacitor circuit using a second resistor 522 and a second capacitor 524 connected together in parallel. Another end of the second resistor 522 and another end of the second capacitor 524 are connected together to one end of the diode. The sensed current 304 flows through another end of the diode.

The peak current 504 is at a node where the second resistor 522 and the second capacitor 524 are connected. The peak current 504 is determined based on a sum of branch currents through the second resistor 522 and the second capacitor 524.

In FIG. 5, there are two bits of information including the average current 502 and the peak current 504. The average current 502 and the peak current 504 can be used to determine three categories of information. One of the categories can indicate that both the average current 502 and the peak current 504 do not exceed the average current ceiling 508 and the peak current ceiling 510, respectively.

Another of the categories can indicate that the average current 502 exceeds the average current ceiling 508. Another of the categories can indicate that the peak current 504 exceeds the peak current ceiling 510. When neither the average current ceiling 508 nor the peak current ceiling 510 is exceeded, the number of the channels 114 can be increased to enhance the performance or throughput since the current value of the electrical power 310 is below a predetermined maximum power level.

It has been discovered that comparing the average current 502 to the average current ceiling 508 and the peak current 504 to the peak current ceiling 510 to determine the electrical power 310 provides improved reliability because the comparing eliminates power spikes that exceed the regulation capability of the host power system thereby improving the reliability.

Figure 6:
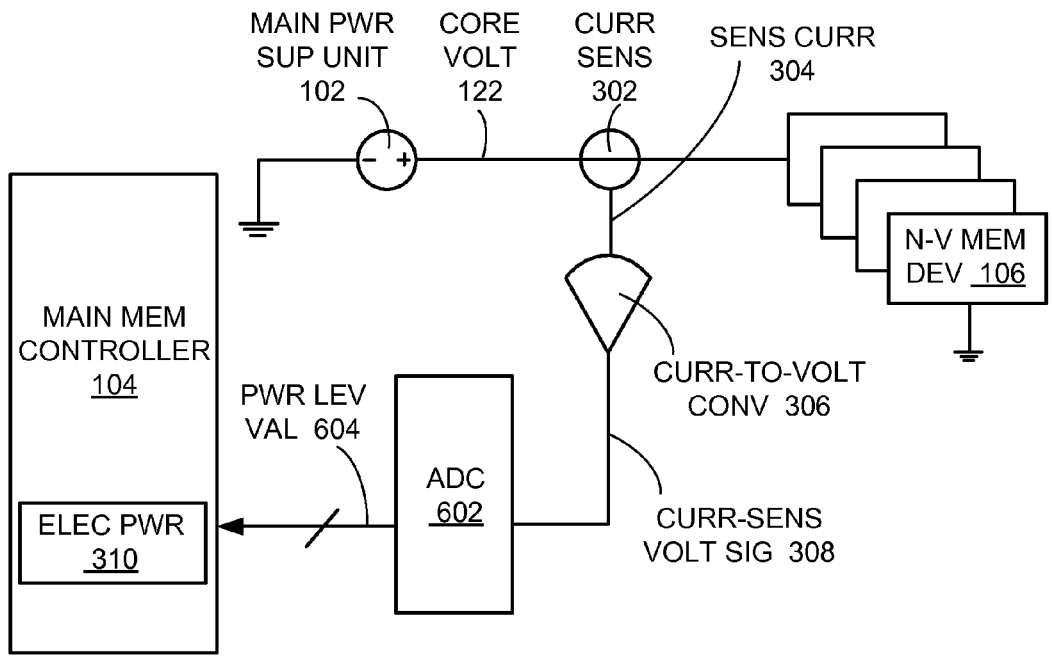
FIG. 6 is a fourth exemplary block diagram of power measurement for the power throttling mechanism.

Referring now to FIG. 6, therein is shown a fourth exemplary block diagram of power measurement for the power throttling mechanism. FIG. 6 depicts a full power level detection for hardware controlled power throttling. FIG. 6 illustrates an isolation of a power of the non-volatile memory devices 106 from a power required from remaining components of the SSD.

The storage control system 100 of FIG. 1 includes an analog-to-digital converter 602, which is a device that converts a continuous physical quantity to a digital number that represents the quantity's amplitude. The conversion involves quantization of the continuous physical quantity. The analog-to-digital converter 602 receives the current-sense voltage signal 308 from the current-to-voltage converter 306.

The analog-to-digital converter 602 generates a power level value 604 by converting the current-sense voltage signal 308 from an analog signal to a digital signal. The main memory controller 104 samples the power level value 604 for the power throttling mechanism associated with the run time with the power measurement to control and/or limit a run time power or the electrical power 310.

The current-to-voltage converter 306 receives the sensed current 304 from the current sensor 302, which receives the electrical current from the main power supply unit 102 that provides the core voltage 122. The current sensor 302 also provides the core voltage 122 supplied by the main power supply unit 102 to the non-volatile memory devices 106.

It has been discovered that generating the power level value 604 to determine the electrical power 310 provides improved reliability. The reliability is improved because the power level value 604 is used for the power throttling mechanism associated with the run time with the power measurement to control and/or limit a run time power or the electrical power 310. Thus, power spikes that take subsystems offline are eliminated.

Figure 7:
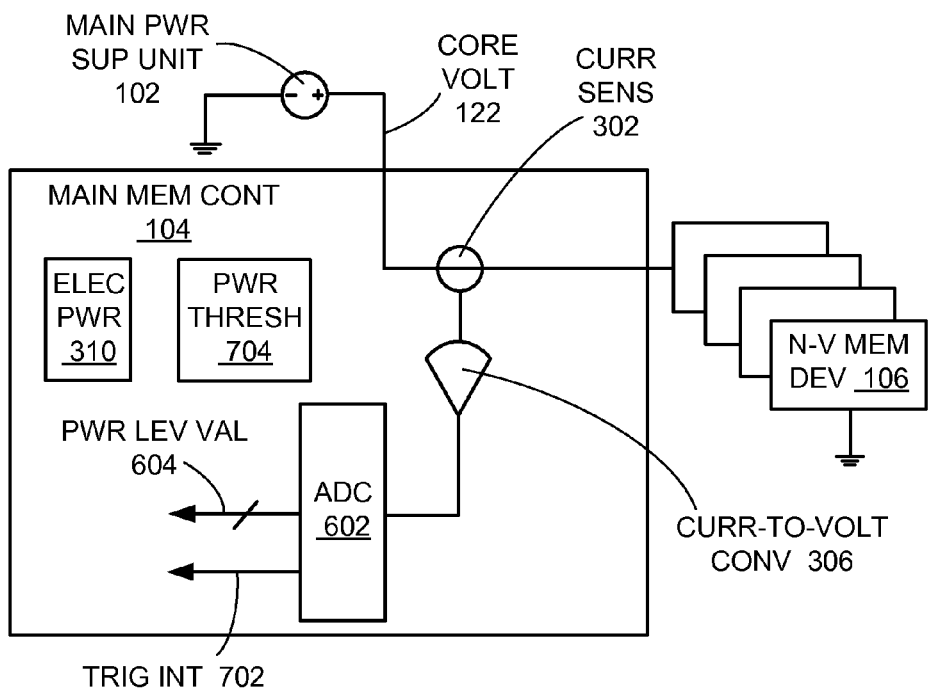
FIG. 7 is a fifth exemplary block diagram of power measurement for the power throttling mechanism.

Referring now to FIG. 7, therein is shown a fifth exemplary block diagram of power measurement for the power throttling mechanism. FIG. 7 depicts a full power level detection for hardware-controlled power throttling mechanism implemented internally in the main memory controller 104.

FIG. 7 illustrates a section of a system level design that is used to measure electrical power or current moved inside the main memory controller 104 including an application-specific integrated circuit (ASIC) NAND controller. The section is implemented within the main memory controller 104 to reduce the overall footprint for the implementation of the main memory controller 104. The section moved inside the main memory controller 104 also goes a long way to reducing errors due to component changes and hardware construction.

The section includes the analog-to-digital converter 602, the current-to-voltage converter 306, and the current sensor 302. The current sensor 302 monitors the electrical current from the main power supply unit 102 that provides the core voltage 122. The current sensor 302 also provides the core voltage 122 supplied by the main power supply unit 102 to the non-volatile memory devices 106.

The analog-to-digital converter 602 generates a trigger interrupt 702 as an input to the main memory controller 104. The trigger interrupt 702 is asserted to an active state when the power level value 604 is greater than a power threshold 704, which is a predetermined numerical value used as a reference for comparison purposes.

When the trigger interrupt 702 is active, the main memory controller 104 limits a run time power or the electrical power 310 using the power throttling mechanism. The main memory controller 104 can sample the power level value 604 for the power throttling mechanism associated with the run time with the power measurement to control and/or limit a run time power or the electrical power 310.

It has been discovered that generating the power level value 604 to determine the electrical power 310 and asserting the trigger interrupt 702 when the power level value 604 is greater than the power threshold 704 provide improved reliability. The reliability is improved because the power level value 604 is used for the power throttling mechanism associated with the run time with the power measurement to control and/or limit a run time power or the electrical power 310. Thus, power spikes that take subsystems offline are eliminated.

It has also been discovered that the section of a system level design that is used to measure the electrical power 310 by generating the power level value 604 and the trigger interrupt 702 within the main memory controller 104 significantly reduces the overall footprint for the implementation of the main memory controller 104. Furthermore, the section moved inside the main memory controller 104 also goes a long way to reducing errors due to component changes and hardware construction.

Figure 8:
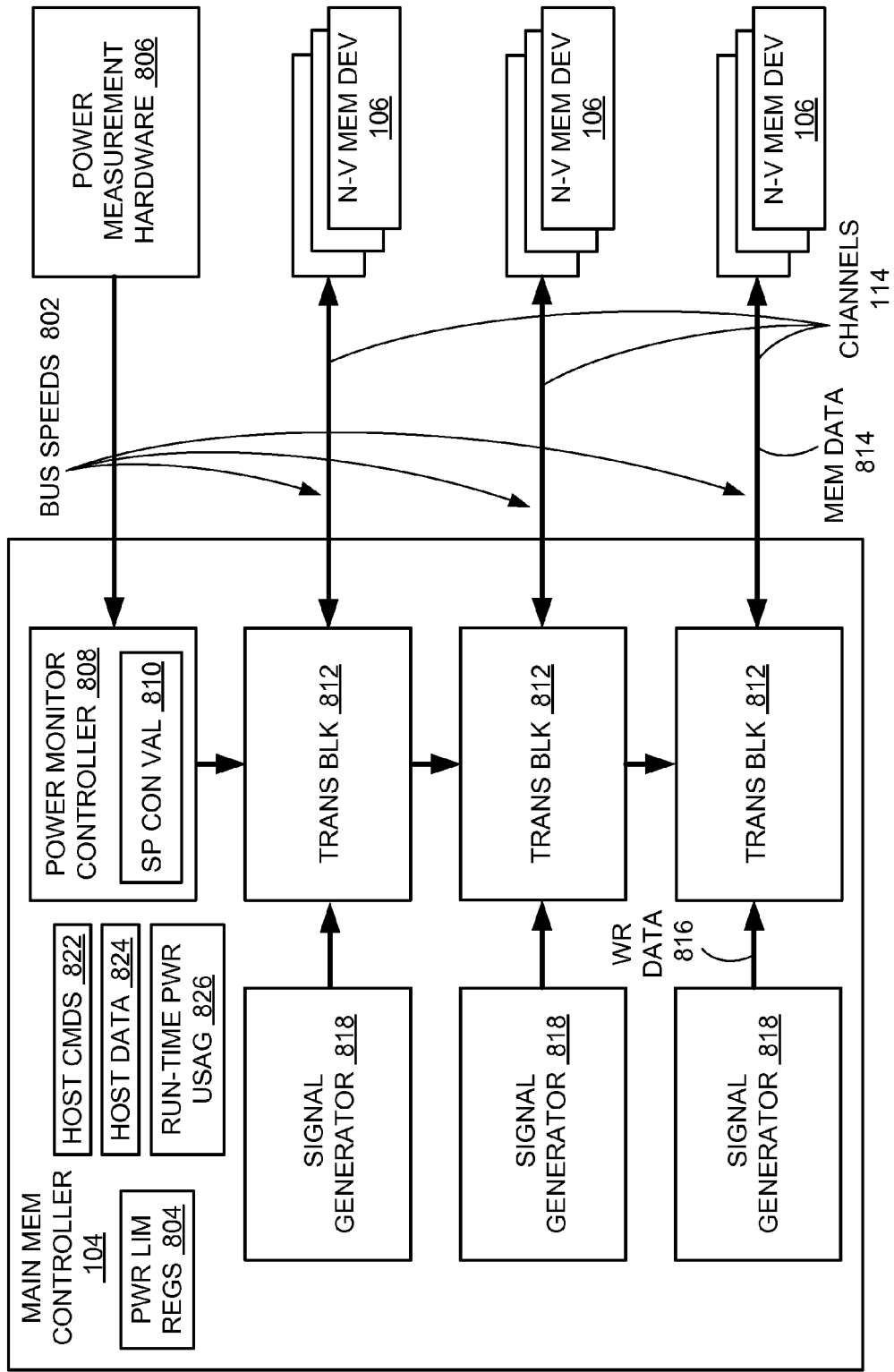
FIG. 8 is a first exemplary block diagram of bus speed control.

Referring now to FIG. 8, therein is shown a first exemplary block diagram of bus speed control. FIG. 8 depicts a full hardware or hardware-only implementation of a hardware control system for the bus speed control of a number of banks of the non-volatile memory devices 106. The bus speed control provides the power throttling mechanism associated with the run time with the power measurement to control and/or limit a run time power or the electrical power 310 of FIG. 3.

The embodiments described herein include the power throttling mechanism associated with the run time with the power measurement to control and/or limit a run time power or the electrical power 310. The embodiments include the power throttling mechanism by controlling data transfers from or to the non-volatile memory devices 106 to control the electrical power 310. The power usage is adjusted by adjusting an amount of time the data transfers take for operations of the non-volatile memory devices 106.

Because each data bus or each of the channels 114 is shared with a number of the non-volatile memory devices 106, the data bus is shared. For example, the bus interface can be a NAND bus interface. The sharing of the data bus limits a number of the operations. A single controlling bus for a given channel can be busy longer but with fewer of the operations per unit time. The channels 114 can be bus interfaces connected to the non-volatile memory devices 106.

Additionally, a large portion of the electrical power 310 is directly related to the data transfers in the channels 114. The electrical power 310 can be adjusted by slowing or even pausing the data transfers in the channels 114 until the electrical power 310 drops or decreases to a predetermined acceptable level.

Bus speeds 802 of the data transfers can be controlled by the software 212 of FIG. 2 (as subsequently described in FIG. 9) or directly by hardware as described in FIG. 8. The bus speeds 802 are rates at which electrical signals are transmitted through bus interfaces or the channels 114. The bus speeds 802 can be based on a number of synchronous clocks that provide timing for data signals transferred in the channels 114. For illustrative purposes, there are three of the channels 114 shown in FIG. 8, although it is understood that there can be any number of the channels 114 operating independently from each other.

The hardware block diagram in FIG. 8 shows the full hardware implementation of bus speed throttling. The software 212 can be able to access power limit registers 804, which are hardware storage elements used for controlling or throttling the electrical power 310. The power limit registers 804 can be implemented with volatile memory devices, non-volatile memory devices, or any other storage elements.

The power limit registers 804 are used to set limit values and alert levels of the electrical power 310. The power limit registers 804 indicate power reference levels, to which the electrical power 310 is compared. The main memory controller 104 increases or decreases the bus speeds 802 when the current value of the electrical power 310 is below or above, respectively, values in the power limit registers 804. The values in the power limit registers 804 can be used to initialize or set the under-current voltage level 412 of FIG. 4, the over-current voltage level 414 of FIG. 4, the average current ceiling 508 of FIG. 5, the peak current ceiling 510 of FIG. 5, and the power threshold 704 of FIG. 7.

FIG. 8 depicts a power measurement hardware 806 that is used to determine a current value of the electrical power 310 consumed by the storage control system 100 of FIG. 1. The electrical power 310 is a numerical value associated with a rate at which electric energy. The electrical power 310 indicates an instantaneous power usage or a run-time power usage of a solid state storage device in the storage control system 100.

The power measurement hardware 806 can be implemented with the current sensor 302 of FIG. 3, the current-to-voltage converter 306 of FIG. 3, the under-current level comparator 408 of FIG. 4, the over-current level comparator 410 of FIG. 4, or a combination thereof to read the current value of the electrical power 310. The power measurement hardware 806 can also be implemented with the current measurement hardware 512 of FIG. 5, the analog-to-digital converter 602 of FIG. 6, or a combination thereof to read the current value of the electrical power 310.

The main memory controller 104 includes a power monitor controller 808 to adjust the bus speeds 802. The power monitor controller 808 adjusts the bus speeds 802 by determining a speed control value 810, which is a numerical value of data transfer rates. The power monitor controller 808 is used for bus speed throttling.

The speed control value 810 is determined based on the current value of the electrical power 310 measured by the power measurement hardware 806. A decrease or an increase in the current value of the electrical power 310 increases or decreases, respectively, the speed control value 810.

The main memory controller 104 includes transfer blocks 812 to interface with the non-volatile memory devices 106 using the channels 114. Each of the transfer blocks 812 is separately connected to one of the channels 114. The transfer blocks 812 send and receive memory data 814 to and from, respectively, the non-volatile memory devices 106. The transfer blocks 812 send and receive the memory data 814 at the bus speeds 802 controlled based on the speed control value 810. The transfer blocks 812 can include transfer engines with predetermined variable bus speed control.

For illustrative purposes, each of the transfer blocks 812 are shown to receive the same value for the speed control value 810, although it is understood that the speed control value 810 can be different for each of the transfer blocks 812. The speed control value 810 can be any numerical values.

For write operations, the transfer blocks 812 receive write data 816 from signal generators 818 in the main memory controller 104. The write data 816 are information associated with storage or management of the non-volatile memory devices 106.

The main memory controller 104 includes the host interface unit 208 of FIG. 2 for interfacing with and receiving information from the host system 120 of FIG. 1. The information incoming from the host system 120 includes host commands 822 and host data 824. The host interface unit 208 stores the host commands 822 and the host data 824 into a cache memory and sends a response to the host system 120.

The main memory controller 104 includes the power measurement hardware 806 for reading a current value of the electrical power 310 supplied by the host system 120 in response to the host commands 822. The electrical power 310 indicates the instantaneous power usage or a run-time power usage 826 of a solid state storage device in the storage control system 100. The run-time power usage 826 is an actual value of the electrical power 310 that is consumed by the drive level components 312 of FIG. 3 including the non-volatile memory devices 106 at a specific instance of time during the drive's operation.

It has been discovered that adjusting the bus speeds 802 based on the current value of the electrical power 310 for controlling the data transfer through the channels 114 provides improved reliability. The reliability is improved because one of the biggest values of the current embodiments that bring to drive operations is the limiting of power spikes not allow by the host system 120, of power levels that are in excess of the capabilities of the host power supply.

It has also been discovered that decreasing the bus speeds 802 when the current value of the electrical power 310 is above values in the power limit registers 804 and increasing the bus speeds 802 when the current value of the electrical power 310 is below the values in the power limit registers 804 provide improved reliability. The reliability is improved because one of the biggest values of the current embodiments that bring to drive operations is the limiting of power spikes not allow by the host system 120, of power levels that are in excess of the capabilities of the host power supply.

Figure 9:
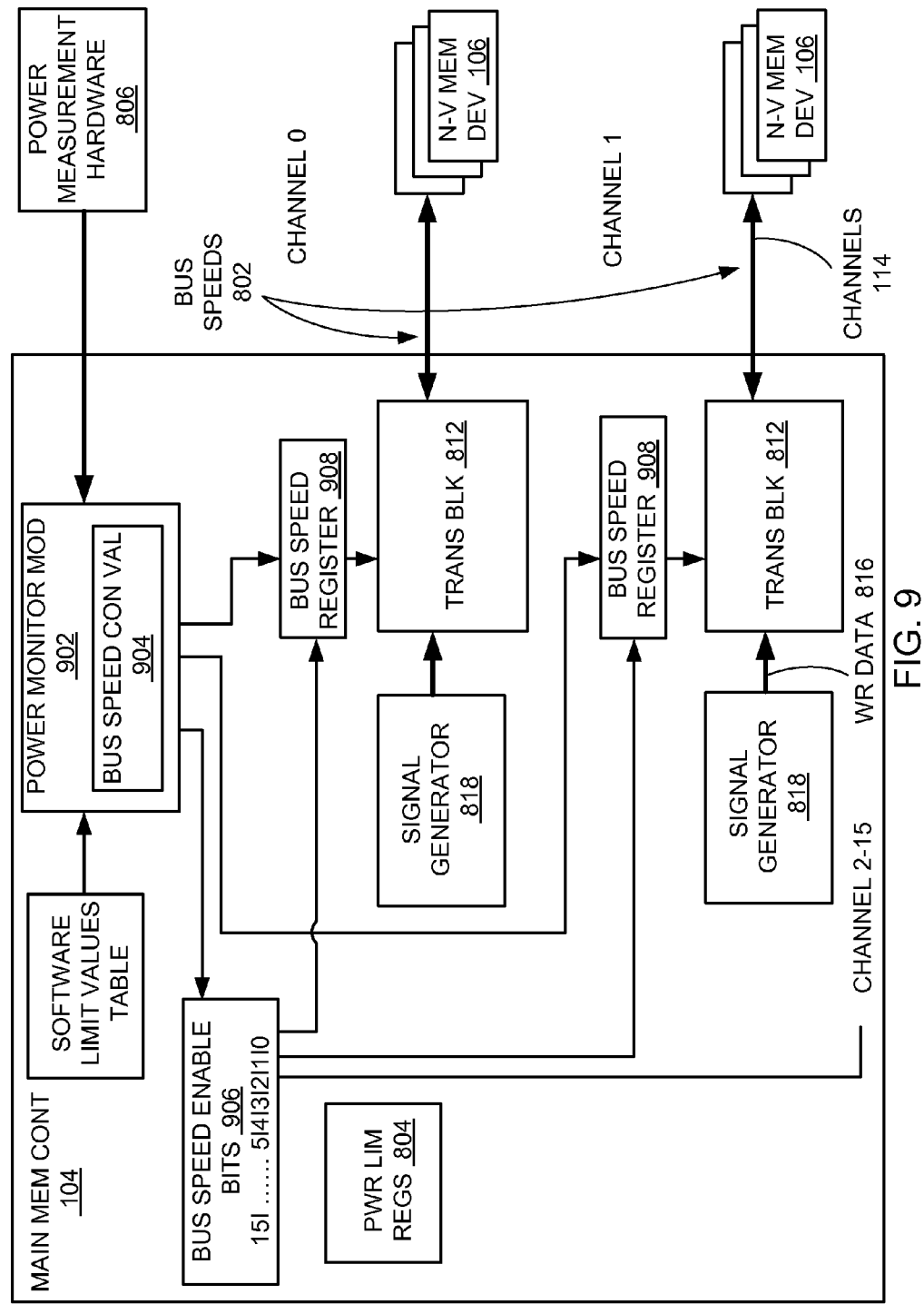
FIG. 9 is a second exemplary block diagram of the bus speed control.

Referring now to FIG. 9, therein is shown a second exemplary block diagram of the bus speed control. FIG. 9 depicts a software monitored control system for the bus speed control. A hardware block diagram in FIG. 9 shows a hardware assist implementation of the bus speed throttling. The bus speed control provides the power throttling mechanism associated with the run time with the power measurement to control and/or limit a run time power or the electrical power 310 of FIG. 3.

The software 212 of FIG. 2 can be able to read an instantaneous power value or the current value of the electrical power 310, apply the value to preset the power limit registers 804, and adjust the bus speeds 802 to influence or control an operating power or the electrical power 310. The values in the power limit registers 804 can be software limits configured by the software 212. For example, the power limit registers 804 can be implemented in a software limit values table, which is a structure for storing and providing a set of power limit and alert values.

This diagram shows a multidrop control structure that allows the firmware 110 of FIG. 1 to issue a bus speed change to one or more device controllers or the transfer blocks 812 with one instruction. The device controllers are for interfacing and managing operations of banks of the non-volatile memory devices 106 including flash memories.

With this implementation, the firmware 110 can elect to have different channels or any number of the channels 114 running at different speeds or the bus speeds 802 to balance the load. This control structure can also allow the bus speeds 802 to be changed during active transfers or at the beginning of transfers. This approach to bus speed control is the least complicated and requires very little hardware to implement. Being firmware-based implementation, tuning algorithms can be developed and deployed to drives that are already at a customer site as a firmware upgrade.

The main memory controller 104 includes a power monitor module 902 to control the bus speeds 802. The power monitor module 902 sets the next value of the electrical power 310 for one or more of the channels 114 in parallel. The power monitor module 902 adjusts the next value of the electrical power 310 by controlling the bus speeds 802 of the channels 114.

The power monitor module 902 controls the bus speeds 802 by determining speed control values 904 based on the current value of the electrical power 310 measured by the power measurement hardware 806. The speed control values 904 are numerical values of data transfer rates.

A decrease or an increase in the current value of the electrical power 310 increases or decreases, respectively, the speed control values 904. The speed control values 904 are input to the transfer blocks 812. The speed control values 904 can be the same for any number of the transfer blocks 812. The speed control values 904 can be different resulting in the bus speeds 802 to be different for any number of the transfer blocks 812.

The power monitor module 902 generates bus speed enable bits 906, which are information used for latching or storing the speed control values 904 to bus speed resisters 908. The bus speed resisters 908 provide the speed control values 904 to the transfer blocks 812. For write operations, the transfer blocks 812 receive the write data 816 from the signal generators 818 in the main memory controller 104. The bus speed enable bits 906 can be stored in a register or a storage element having bus speed latch enable bit fields.

Functions or operations of the main memory controller 104 as described above can be implemented in hardware, software, or a combination thereof. The main memory controller 104 can be implemented with the control unit 202 of FIG. 2, the storage unit 204 of FIG. 2, the memory interface unit 206 of FIG. 2, the host interface unit 208 of FIG. 2, or a combination thereof.

For example, the power monitor module 902 can be implemented with the control unit 202 to adjust the next value of the electrical power 310 by controlling the bus speeds 802 of the channels 114 and generate the bus speed enable bits 906.

It has been discovered that the power monitor module 902 for adjusting the next value of the electrical power 310 by controlling the bus speeds 802 of the channels 114 and generating the bus speed enable bits 906 provide improved reliability. The reliability is improved because one of the biggest values of the current embodiments that bring to drive operations is the limiting of power spikes not allow by the host system 120 of FIG. 1, of power levels that are in excess of the capabilities of the host power supply. Furthermore, the power monitor module 902 provides the improved reliability with a seamless integration of the power throttling mechanism to drives that are already at a customer site as a firmware upgrade.

Figure 10:
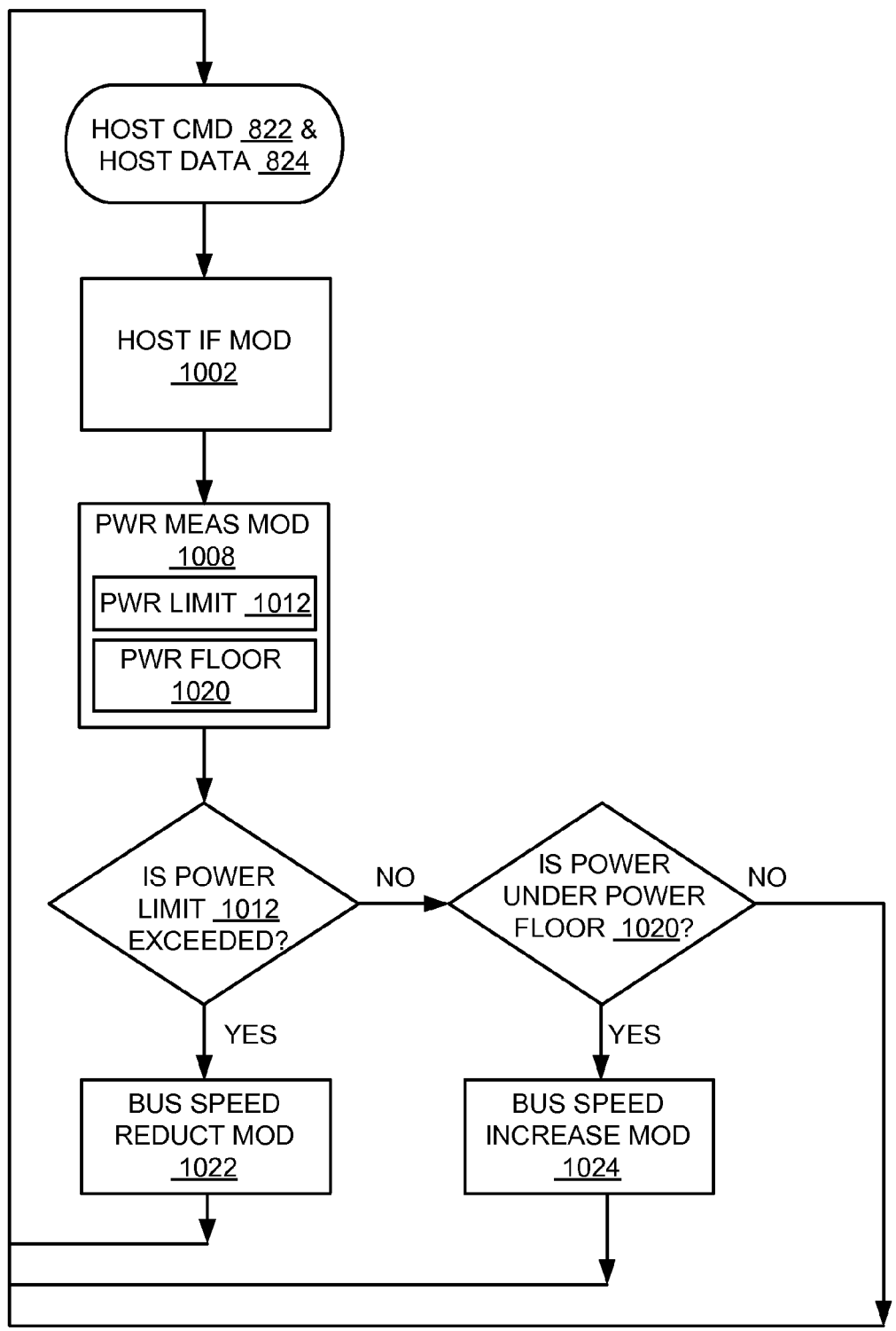
FIG. 10 is a flow chart of the main memory controller of FIG. 1.

Referring now to FIG. 10, therein is shown a flow chart of the main memory controller 104 of FIG. 1. The flow chart shows the bus speed control for the power throttling mechanism associated with the run time with the power measurement to control and/or limit a run time power or the electrical power 310 of FIG. 3.

For example, FIG. 10 depicts the flow chart that can be implemented with the software 212 of FIG. 2 with a polling mechanism. FIG. 10 includes a basic system level flow for how power throttling would be used with the hardware described in the embodiments described herein. The flow chart shows how the bus speeds 802 of FIG. 8 can be controlled, which can also control the power usage of the drive.

The flow chart shows a polling method of firmware implementation of changing bus transfer speeds or the bus speeds 802 to manage power throttling. For example, this can be done by continuously monitoring the electrical power 310. Also for example, this can also be done using an N-level power interrupt notification method of hardware as outlined in FIG. 4.

Both hardware and software implementations have the same effect on the overall operation of the drive. During high power operations, the main memory controller 104 in the storage control system 100 of FIG. 1 decides to slow down or pause transfer busses or the channels 114 of FIG. 1 thereby limiting the number of the operations that can be executed limited by the availability of the transfer busses to send new commands. Additionally, running the transfer busses slower has an effect of reducing an I/O power required to make the data transfers.

The main memory controller 104 includes a host interface module 1002 for interfacing with and receiving information from the host system 120 of FIG. 1. The information incoming from the host system 120 includes the host commands 822 and the host data 824. The host interface module 1002 stores the host commands 822 and the host data 824 into a cache memory and sends a response to the host system 120.

The main memory controller 104 includes a power measurement module 1008 for reading a current value of the electrical power 310 supplied by the host system 120 in response to the host commands 822. The electrical power 310 indicates the instantaneous power usage or the run-time power usage 826 of FIG. 8 of a solid state storage device in the storage control system 100.

The electrical power 310 can be determined based on the current-sense voltage signal 308 of FIG. 3, the under-current signal 402 of FIG. 4, the over-current signal 404 of FIG. 4, the average current 502 of FIG. 5, the peak current 504 of FIG. 5, the power level value 604 of FIG. 6, or a combination thereof. The power measurement module 1008 reads the current value of the electrical power 310 consumed by the non-volatile memory devices 106 of FIG. 1, the main memory controller 104, any of the drive level components 312 of FIG. 3 of the storage control system 100, or a combination thereof.

The power measurement module 1008 compares the electrical power 310 to a power limit 1012, which is a numerical value that is associated with a maximum amount of energy allowable to be consumed in the drive. The power measurement module 1008 also compares the electrical power 310 to a power floor 1020, which is a numerical value that is associated with a minimum amount of energy allowable to be consumed in the drive.

The power limit 1012 is associated with the over-current voltage level 414 of FIG. 4, the average current ceiling 508 of FIG. 5, the peak current ceiling 510 of FIG. 5, the power threshold 704 of FIG. 7, or any other value that indicates maximum amount of energy allowable to be consumed in the drive. The power floor 1020 is associated with the under-current voltage level 412 of FIG. 4, the power threshold 704, or any other value that indicates minimum amount of energy predetermined to be consumed in the drive.

The embodiments described herein have two effects. One effect is that the faster data is transferred, the more the electrical power 310 is consumed because of an increase of a number of transfer edges of electrical signals in data busses or the channels 114. Therefore, a savings or reduction of the electrical power 310 is achieved by slowing the data busses down from that aspect.

The main memory controller 104 includes a bus speed reduction module 1022 for decreasing the bus speeds 802. If the power limit 1012 is exceeded or the current value of the electrical power 310 is greater than or equal to the power limit 1012, the bus speeds 802 are decreased to effectively decrease the next value of the electrical power 310. This is a case when the data is transferred too fast, the more the electrical power 310 is consumed because of an increase of a number of transfer edges of electrical signals in the channels 114. Therefore, reduction of the electrical power 310 is achieved by slowing the data busses down.

The main memory controller 104 includes a bus speed increase module 1024 for increasing the bus speeds 802. If the electrical power 310 is less than the power limit 1012 and under or less than the power floor 1020, the bus speeds 802 are increased. A speed up or an increase in the bus speeds 802 effectively increases the next value of the electrical power 310. This is another case when the data is transferred too slowly, the less the electrical power 310 is consumed because of a decrease of a number of transfer edges of electrical signals in the data busses or the channels 114. Therefore, speeding the data busses up subsequently increases the electrical power 310 to be greater than the power floor 1020.

If the electrical power 310 is less than the power limit 1012 and greater than the power floor 1020, the bus speeds 802 are not changed and thus remain the same until the next comparison of the electrical power 310. This is a case when the electrical power 310 is within a predetermined range between the power floor 1020 and the power limit 1012.

Functions or operations of the main memory controller 104 as described above can be implemented in hardware, software, or a combination thereof. The main memory controller 104 can be implemented with the control unit 202 of FIG. 2, the storage unit 204 of FIG. 2, the memory interface unit 206 of FIG. 2, the host interface unit 208 of FIG. 2, or a combination thereof.

For example, the host interface module 1002 can be implemented with the control unit 202, the storage unit 204, the memory interface unit 206, and the host interface unit 208 to receive the host commands 822 from the host system 120 and storing the host data 824 in the buffer block 112 of FIG. 1. Also for example, the power measurement module 1008 can be implemented with the control unit 202, the current sensor 302 of FIG. 3, the current-to-voltage converter 306 of FIG. 3, the under-current level comparator 408 of FIG. 4, the over-current level comparator 410 of FIG. 4, the current measurement hardware 512 of FIG. 5, the analog-to-digital converter 602 of FIG. 6, or a combination thereof to read the current value of the electrical power 310.

Further, for example, the power measurement module 1008 can be implemented with the control unit 202, the current sensor 302, and the current-to-voltage converter 306 to monitor the current-sense voltage signal 308 to determine the electrical power 310. Further, for example, the power measurement module 1008 can be implemented with the control unit 202, the under-current level comparator 408, and the over-current level comparator 410 to compare the current-sense voltage signal 308 to the under-current voltage level 412 and the over-current voltage level 414.

Further, for example, the power measurement module 1008 can be implemented with the control unit 202 and the current measurement hardware 512 to compare the average current 502 to the average current ceiling 508 and the peak current 504 to the peak current ceiling 510. Further, for example, the power measurement module 1008 can be implemented with the control unit 202 and the analog-to-digital converter 602 to generate the power level value 604 by converting the current-sense voltage signal 308 from an analog signal to a digital signal and assert the trigger interrupt 702 of FIG. 7.

For example, the bus speed reduction module 1022 can be implemented with the control unit 202 to decrease the bus speeds 802. Also for example, the bus speed increase module 1024 can be implemented with the control unit 202 to increase the bus speeds 802.

The power measurement module 1008 can be coupled to the host interface module 1002. The bus speed reduction module 1022 and the bus speed increase module 1024 can be coupled to the power measurement module 1008 and the host interface module 1002.

The storage control system 100 is described with module functions or order as an example. The modules can be partitioned differently. For example, the bus speed reduction module 1022 and the bus speed increase module 1024 can be combined. Each of the modules can operate individually and independently of the other modules.

Furthermore, data generated in one module can be used by another module without being directly coupled to each other. Yet further, the host interface module 1002, the power measurement module 1008, the bus speed reduction module 1022, and the bus speed increase module 1024 can be implemented as hardware accelerators (not shown) within the control unit 202 or can be implemented as hardware accelerators (not shown) in the main memory controller 104 or outside of the main memory controller 104.

Figure 11:
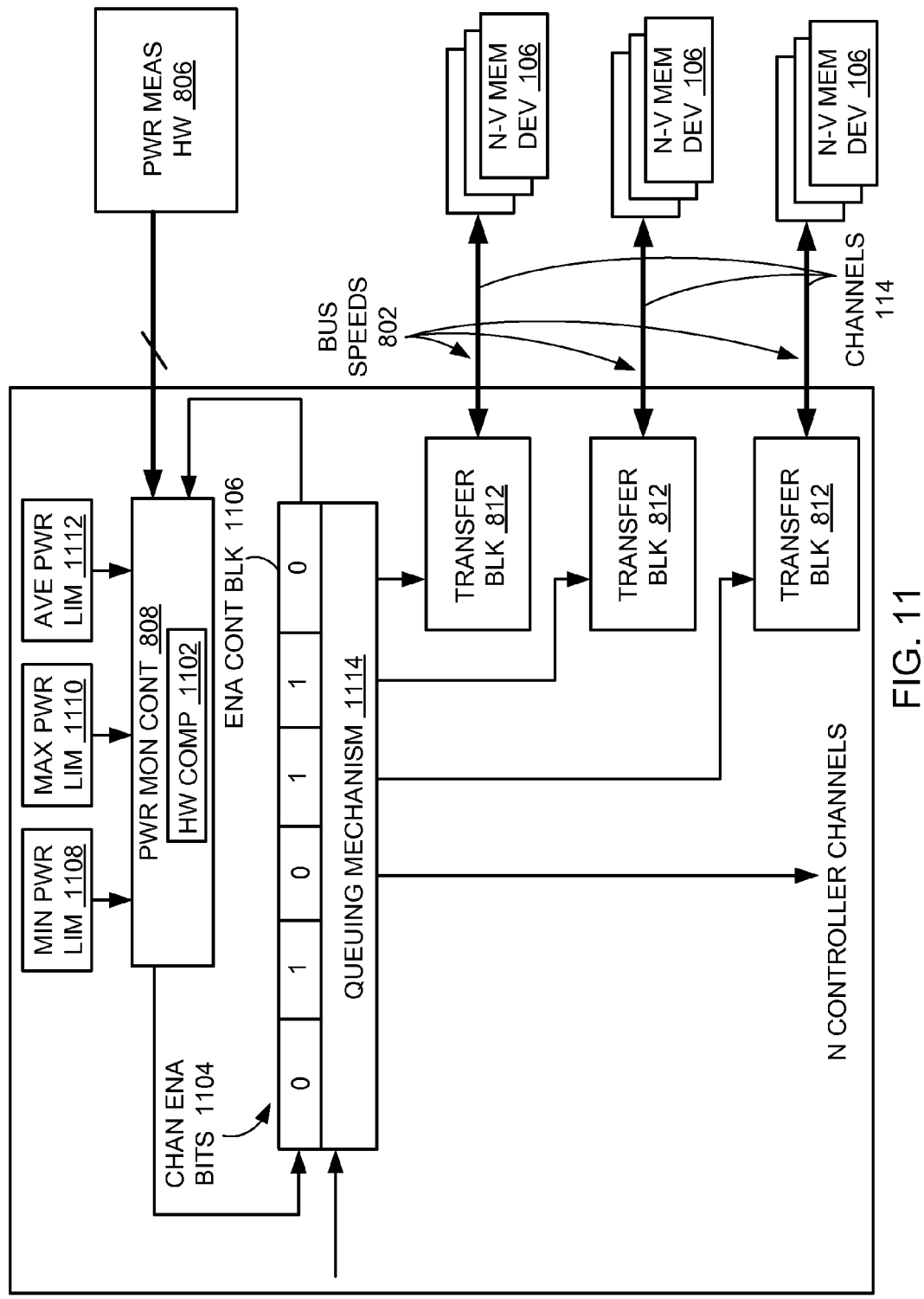
FIG. 11 is a third exemplary block diagram of the bus speed control.

Referring now to FIG. 11, therein is shown a third exemplary block diagram of the bus speed control. FIG. 11 depicts one of the possible implementations for a full hardware control system structure. The bus speed control provides the power throttling mechanism associated with the run time with the power measurement to control and/or limit a run time power or the electrical power 310 of FIG. 3.

The third exemplary block diagram in FIG. 11 shows how an incoming power measurement hardware or the power measurement hardware 806 feeds the current value of the electrical power 310 into a set of hardware comparators 1102 in the power monitor controller 808. The power measurement hardware 806 can be an external power monitoring hardware. For example, the electrical power 310 can be an N-bit power signal, where N is any counting number.

The power monitor controller 808 adjusts the next value of the electrical power 310 by enabling a number of the channels 114. The power monitor controller 808 enables the number of the channels 114 by determining channel enable bits 1104 for controlling which of the channels 114 are to be operated. The power monitor controller 808 generates the channel enable bits 1104 based on a current value or an average value of the electrical power 310.

The hardware comparators 1102 then feed an enable control block 1106 that generates a stream of enable bits or the channel enable bits 1104, which control each of the bus transfer speeds or the bus speeds 802 on each individual bus transfer controller or the transfer blocks 812. The hardware in the embodiments described herein can be designed in such a way that some of the channels 114 can be throttled more or less than other channels based on what kind of data is stored in the channels 114. For illustrative purposes, three of the transfer blocks 812 are shown, although it is understood that there can be any number of the transfer blocks 812.

The hardware comparators 1102 compare the electrical power 310 to a minimum power limit 1108 or a maximum power limit 1110. The minimum power limit 1108 is a numerical value that is associated with a minimum amount of energy allowable to be consumed in the drive. The maximum power limit 1110 is a numerical value that is associated with a maximum amount of energy allowable to be consumed in the drive.

The minimum power limit 1108 is associated with the under-current voltage level 412 of FIG. 4, the power threshold 704 of FIG. 7, or any other value that indicates minimum amount of energy predetermined to be consumed in the drive. The maximum power limit 1110 is associated with the over-current voltage level 414 of FIG. 4, the average current ceiling 508 of FIG. 5, the peak current ceiling 510 of FIG. 5, the power threshold 704, or any other value that indicates maximum amount of energy allowable to be consumed in the drive.

The power measurement hardware 806 can generate the average value of the electrical power 310 and send the average value to the hardware comparators 1102. The hardware comparators 1102 compare the average of the electrical power 310 to an average power limit 1112. The average power limit 1112 is a numerical value that is associated with a total power averaged over a predetermined period.

For example, the channel enable bits 1104 can be generated using a code generation scheme using Gray code. Also for example, the channel enable bits 1104 can be generated such that each time the channel enable bits 1104 are updated, only one of the channels 114 that are currently enabled or disabled is to be disabled or enabled, respectively. Further, for example, the channel enable bits 1104 can be generated to indicate the number of the channels 114 that are to be enabled for transferring data to/from the non-volatile memory devices 106.

Yet further, for example, the channel enable bits 1104 can be generated such that there are at least N bits, where N is a total number of the channels 114 to be enabled for transferring the data. The channels 114 are disabled or enabled by assigning the channel enable bits 1104 to an inactive state or an active state, respectively. For illustrative purposes, the channel enable bits 1104 are shown having 6 bits, although it is understood that the channel enable bits 1104 can include any number of bits.

When the current value or the average value of the electrical power 310 is greater than the maximum power limit 1110 or the average power limit 1112, respectively, the channel enable bits 1104 can be generated such that the number of the channels 114 to be enabled or operated decreases. When the current value or the average value of the electrical power 310 is less than the minimum power limit 1108 or the average power limit 1112, respectively, the channel enable bits 1104 can be generated such that the number of the channels 114 to be enabled or operated increases.

When the current value of the electrical power 310 is less than or equal to the maximum power limit 1110 and greater than or equal to the minimum power limit 1108, the channel enable bits 1104 do not change. When the average value of the electrical power 310 is equal to the average power limit 1112, the channel enable bits 1104 do not change.

The channel enable bits 1104 are used to enable or disable the transfer blocks 812 resulting in enabling or disabling the operations of a number of the channels 114. The power monitor controller 808 can include a queuing mechanism 1114 for scheduling the commands or the operations for the non-volatile memory devices 106 based on priority queuing, dependent on the data stored in each of the channels 114. The queuing mechanism 1114 can be used to schedule the commands or the operations to any number of the transfer blocks 812.

It has been discovered that the channel enable bits 1104 provides improved reliability. The reliability is improved because the channel enable bits 1104 are generated such that each time the channel enable bits 1104 are updated, only one of the channels 114 that are currently enabled or disabled is to be disabled or enabled, respectively, thereby eliminating power levels that are in excess of the capabilities of the host power supply.

Figure 12:
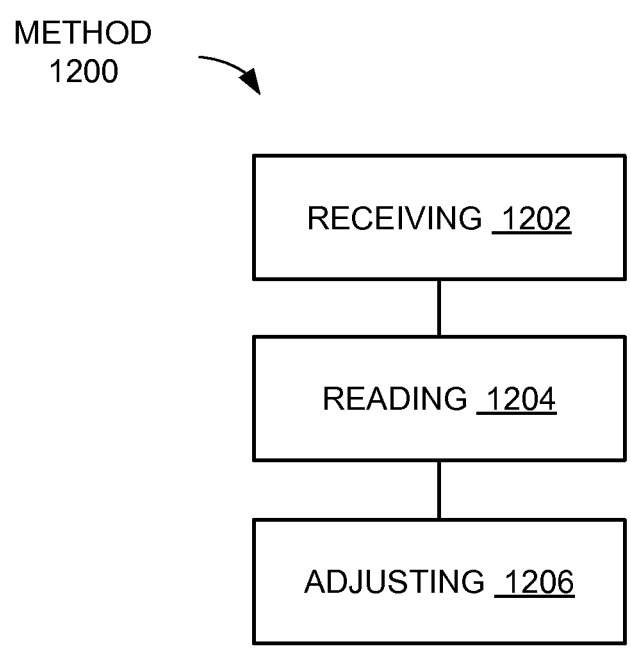
FIG. 12 is a flow chart of a method of operation of a storage control system in a further embodiment of the present invention.

Referring now to FIG. 12, therein is shown a flow chart of a method 1200 of operation of a storage control system in a further embodiment of the present invention. The method 1200 includes: receiving a host command from a host system in a block 1202; reading a current value of electrical power supplied by the host system in response to the host command in a block 1204; and adjusting a bus speed for controlling data transfer through a channel shared by a number of non-volatile memory devices, the bus speed is adjusted based on the current value of the electrical power in a block 1206.

Accordingly, it has been discovered that the present embodiments thus have numerous aspects. One such aspect is that this architecture lays out a means to allow a media controller to adjust dynamically the run time power usage of a solid state storage device.

Another aspect of the present embodiments is that this architecture allows the instantaneous electrical current (power) measurement as a means to control future electrical current usage.

Another aspect of the present embodiments is that this process allows the instantaneous electrical current (power) measurement as a means to control the instantaneous electrical current usage of a solid state storage device.

Another aspect of the present embodiments is that this invention provides a means for the firmware to better schedule NAND workloads to manage total drive power usage.

Another aspect of the present embodiments is that minimum, maximum, and rate of change of electrical current usage is controlled in real time.

Another aspect of the present embodiments is that the tuning algorithms allows for field upgrades, where tuning algorithms are implemented in the firmware to elect to have different channels or any number of the channels running at different speeds or the bus speeds to balance the load.

Another aspect of the present embodiments is that the bus speed control mechanism is customized for specific customer/application requirements since the bus speed control mechanism is the least complicated and requires very little hardware to implement or the bus speed control mechanism includes the tuning algorithms that is developed and seamlessly deployed to drives already at a customer site.

Another aspect of the present embodiments is that this process is applied to several sub-sections of the device or the drive for determining NAND power, DRAM power, or the total drive power.

Another aspect of the present embodiments is a means to control current/power at a macro level.

Another aspect of the present embodiments is a means to control current/power at a micro level.

The concept described in the present embodiments can be constructed and used in a solid state drive (SSD) under development. This concept can also be retrofitted into almost any SSD product with addition of power/current measurement hardware and some interface logic to the controller. Products or systems that can benefit from the present embodiments can include all of the stand-alone form factor SSD devices and the storage devices having multiple SSD devices combined and presented to the host as a single unit.

Thus, it has been discovered that the storage control system of the present invention furnishes important and heretofore unknown and unavailable solutions, capabilities, and functional aspects for a storage control system with power throttling mechanism. The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a storage system comprising:
   at the storage system, receiving a host command from a host system, the host command comprising a write command;
   at the storage system, in response to the host command, reading a current value of electrical power drawn by the storage system; and
   at the storage system, in accordance with the current value of the electrical power drawn by the storage system, adjusting a bus speed for controlling a data transfer rate of one or more channels coupling a memory controller of the storage system to non-volatile memory devices of the storage system.

2. The method as claimed in claim 1 wherein adjusting the bus speed includes adjusting the bus speed based on comparison of the electrical power and a power limit register.

3. The method as claimed in claim 1 wherein adjusting the bus speed includes adjusting bus speeds based on the current value of the electrical power, one of the bus speeds is different from another of the bus speeds and for controlling the data transfer through the channel.

4. The method as claimed in claim 1 wherein the storage system includes a plurality of channels coupling the memory controller to the non-volatile memory devices, and the method further includes, at the storage system, in accordance with the current value of the electrical power drawn by the storage system, adjusting a number of parallel data transfer operations over the plurality of channels.

5. The method as claimed in claim 1 wherein adjusting the bus speed includes generating channel enable bits for controlling a number of channels based on the current value of the electrical power.

6. The method as claimed in claim 1, wherein adjusting the bus speed includes decreasing the bus speed when the current value of the electrical power is above a value in a power limit register and increasing the bus speed when the current value of the electrical power is below the value in the power limit register.

7. The method as claimed in claim 1, wherein the storage system includes a plurality of channels coupling the memory controller to the non-volatile memory devices, adjusting the bus speed includes adjusting bus speeds for two or more of the plurality of channels based on the current value of the electrical power, and one of the bus speeds is different from another of the bus speeds.

8. The method as claimed in claim 1, wherein adjusting the bus speed includes decreasing the bus speed when the current value of the electrical power is greater than a power limit and increasing the bus speed when the current value of the electrical power is less than a power floor.

9. The method as claimed in claim 1, wherein the storage system includes a plurality of channels coupling the memory controller to the non-volatile memory devices, adjusting the bus speed includes generating channel enable bits for controlling a number of the plurality of channels based on the current value of the electrical power, and a number of the channel enable bits equals the number of the channels.

10. A storage system comprising:
a host interface unit for receiving a host command from a host system, the host command comprising a write command;
power measurement hardware, coupled to the host interface unit, for reading a current value of electrical power drawn by the storage system in response to the host command; and
a power monitor controller, coupled to the power measurement hardware, for adjusting a bus speed for controlling, in accordance with the current value of the electrical power drawn by the storage system, a data transfer rate of one or more channels coupling a memory controller of the storage system to non-volatile memory devices of the storage system.

11. The system as claimed in claim 10 wherein the power monitor controller is for adjusting the bus speed based on comparison of the electrical power and a power limit register.

12. The system as claimed in claim 10 wherein the power monitor controller is for adjusting bus speeds based on the current value of the electrical power, one of the bus speeds is different from another of the bus speeds and for controlling the data transfer through the channel.

13. The system as claimed in claim 10 wherein the storage system includes a plurality of channels coupling the memory controller to the non-volatile memory devices, and the power monitor controller is for adjusting a number of parallel data transfer operations over the plurality of channels in accordance with the current value of the electrical power drawn by the storage system.

14. The system as claimed in claim 10 wherein the power monitor controller is for generating channel enable bits for controlling a number of channels based on the current value of the electrical power.

15. The system as claimed in claim 10 wherein the power measurement hardware is for reading the current value of the electrical power measured based on a sensed current.

16. The system as claimed in claim 10, wherein the power monitor controller is for decreasing the bus speed when the current value of the electrical power is above a value in a power limit register and increasing the bus speed when the current value of the electrical power is below the value in the power limit register.

17. The system as claimed in claim 10, wherein the storage system includes a plurality of channels coupling the memory controller to the non-volatile memory devices, the power monitor controller is for adjusting bus speeds for two or more of the plurality of channels based on the current value of the electrical power, and one of the bus speeds is different from another of the bus speeds.

18. The system as claimed in claim 10, wherein the power monitor controller is for decreasing the bus speed when the current value of the electrical power is greater than a power limit and increasing the bus speed when the current value of the electrical power is less than a power floor.

19. The system as claimed in claim 10, wherein the storage system includes a plurality of channels coupling the memory controller to the non-volatile memory devices, the power monitor controller is for generating channel enable bits for controlling a number of the plurality of channels based on the current value of the electrical power, and a number of the channel enable bits equals the number of the channels.

* * * * *